United States Patent
Arora et al.

(10) Patent No.: US 11,025,522 B2
(45) Date of Patent: Jun. 1, 2021

(54) PATH MONITORING SYSTEM (PMS) CONTROLLER OR INGRESS NODE BASED MULTIPROTOCAL LABEL SWITCHING (MPLS) PING AND TRACEROUTE IN INTER- AUTONOMOUS SYSTEM (AS) SEGMENT ROUTING (SR) NETWORKS

(71) Applicant: Juniper Networks, Inc., Sunnyvale, CA (US)

(72) Inventors: Kapil Arora, Bangalore (IN); Shraddha Hegde, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/403,540

(22) Filed: May 4, 2019

(65) Prior Publication Data
US 2020/0351188 A1    Nov. 5, 2020

(51) Int. Cl.
   *H04L 12/26*     (2006.01)
   *H04L 12/751*    (2013.01)
   *H04L 12/723*    (2013.01)

(52) U.S. Cl.
   CPC ......... *H04L 43/10* (2013.01); *H04L 43/0811* (2013.01); *H04L 45/08* (2013.01); *H04L 45/50* (2013.01)

(58) Field of Classification Search
   CPC ..... H04L 43/0811; H04L 43/10; H04L 45/00; H04L 49/555; H04L 45/50
   See application file for complete search history.

(56) References Cited

U.S. PATENT DOCUMENTS

| | | | |
|---|---|---|---|
| 5,926,101 A * | 7/1999 | Dasgupta | H04L 45/48 340/2.81 |
| 7,940,695 B1 * | 5/2011 | Bahadur | H04L 43/0811 370/254 |

(Continued)

OTHER PUBLICATIONS

Extended European Search Report to corresponding European Patent Application No. 19181898.8-1215, dated Nov. 26, 2019 (8 pgs.).
Arora et al, "Ping and Traceroute In Inter-Autonomous System (AS) Segment Routing (SR) Networks Without Requiring Headend Router Or Path Monitoring System (PMS) Controller Knowledge of Topology Outside of Origin AS," Specification, Claims, Abstract and Drawings from co-pending U.S. Appl. No. 16/787,911, filed Feb. 11, 2020.

(Continued)

*Primary Examiner* — Syed Ali
(74) *Attorney, Agent, or Firm* — John C. Pokotylo; Pokotylo Patent Services

(57) ABSTRACT

Echo or traceroute functionality is supported in a path spanning multiple autonomous systems (ASes) having segment routing (SR) enabled, the path including an ingress node and an egress node, by: (a) obtaining a return label stack to reach the ingress node from either (A) the egress node, or (B) a transit node in the path; (b) obtaining a label stack to reach, from the ingress node, either (A) the egress node, or (B) the transit node; (c) generating a request message including the return label stack; and (d) sending the request message towards either (A) the egress node, or (B) the transit node using the label stack. The example method may further include: (e) receiving, by either (A) the egress node, or (B) the transit node, the request message, wherein the request message includes information for performing a validity check; (f) performing a validity check using the information included in the request message to generate validity information; (g) generating a reply message including the validity information and information from the return label stack; and (h) sending the reply message towards the ingress node using information from the return label stack included in the request message.

17 Claims, 16 Drawing Sheets

(56) References Cited

U.S. PATENT DOCUMENTS

| | | | |
|---|---|---|---|
| 8,472,346 | B1 | 6/2013 | Bahadur et al. |
| 10,554,425 | B2* | 2/2020 | Kebler .................... H04L 45/00 |
| 2002/0131583 | A1* | 9/2002 | Lu ............................ H04B 3/23 379/406.08 |
| 2009/0086726 | A1 | 4/2009 | Savage et al. |
| 2013/0128751 | A1* | 5/2013 | Keesara ............. H04L 41/0677 370/248 |
| 2014/0269725 | A1* | 9/2014 | Filsfils ................. H04L 45/507 370/392 |
| 2014/0369356 | A1* | 12/2014 | Bryant ................... H04L 45/04 370/392 |
| 2015/0304206 | A1* | 10/2015 | Filsfils ................... H04L 45/04 709/238 |
| 2017/0093487 | A1* | 3/2017 | Grammel ............. H04B 10/038 |
| 2017/0346718 | A1* | 11/2017 | Psenak .................... H04L 45/02 |
| 2018/0205641 | A1* | 7/2018 | Pignataro ............. H04L 45/507 |
| 2018/0278510 | A1 | 9/2018 | Iqbal et al. |

OTHER PUBLICATIONS

Arora et al, "Time to Live (TTL) Handing for Segment Routing Ping/Traceroute," Specification, Claims, Abstract and Drawings from co-pending U.S. Appl. No. 16/250,631, filed Jan. 17, 2019 (53 pgs.)

Filsfils et al. "Segment Routing Architecture," *Request for Comments 8402* (Internet Engineering Task Force, Jul. 2018).

Geib et al. "A Scalable and Topology-Aware MPLS Data-Plane Monitoring System" *Request for Comments 8403* (Internet Engineering Task Force, Jul. 2018).

Kompella et al, "Detecting Multiprotocol Label Switched (MPLS) Data-Plane Failures," *Request for Comments 8029*, (Internet Engineering Task Force, Mar. 2017).

Non-Final Office Action to U.S. Appl. No. 16/250,631, dated Jun. 24, 2020 (13 pgs.).

\* cited by examiner

FIGURE 4

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| TYPE 410 | | | | | | | | | | | | | | | | LENGTH 420 | | | | | | | | | | | | | | | |
| NUMBER OF ELEMENTS IN SET 430 | | | | | | | | | | | | | | | | FLAGS 440 | | | | | | | | | | | | | | | |
| IPv4 ADDRESS / IPv6 ADDRESS 450 | | | | | | | | | | | | | | | | | | | | | | | | | | | | | | | |
| LABEL (20 BITS) 460 | | | | | | | | | | | | | | | | | | | | RESERVED 470 | | | | | | | | | | |
| ..... | | | | | | | | | | | | | | | | | | | | | | | | | | | | | | | |

| 0 | | | | | | | | | | 1 | | | | | |
|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 |
| MBZ | | | | | | | | | | | | | | | F |

| 0 | | | | | | | | | | 1 | | | | | | | | | | 2 | | | | | | | | | | 3 | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| TYPE | | | | | | | | | | | | | | | | LENGTH | | | | | | | | | | | | | | | |
| IPv6 ADDRESS | | | | | | | | | | | | | | | | | | | | | | | | | | | | | | | |
| ..... | | | | | | | | | | | | | | | | | | | | | | | | | | | | | | | |

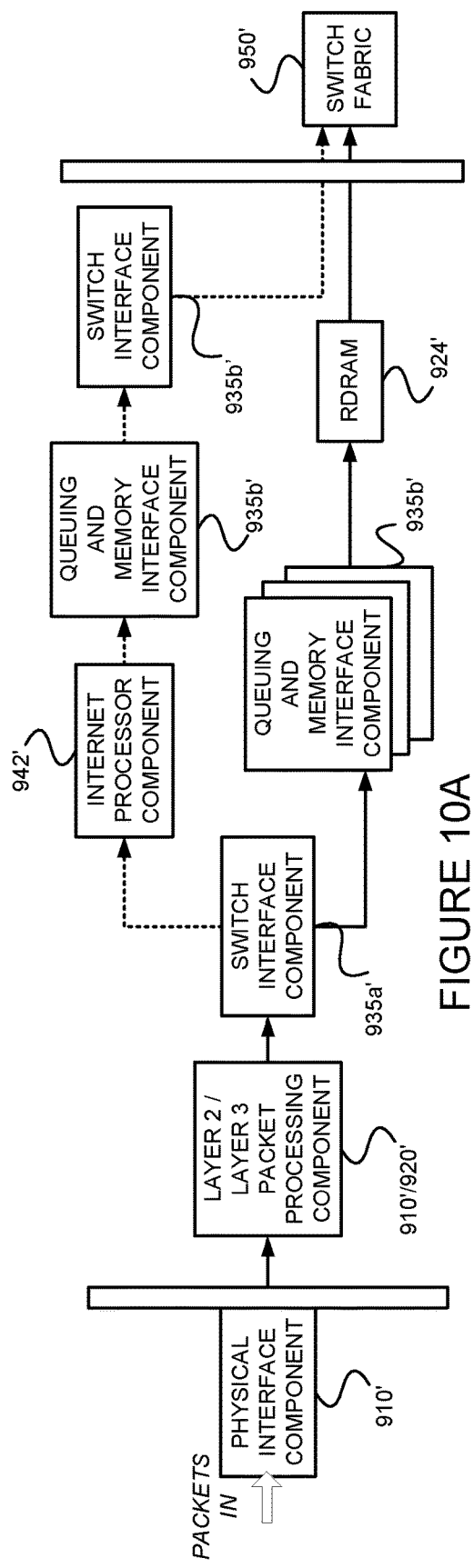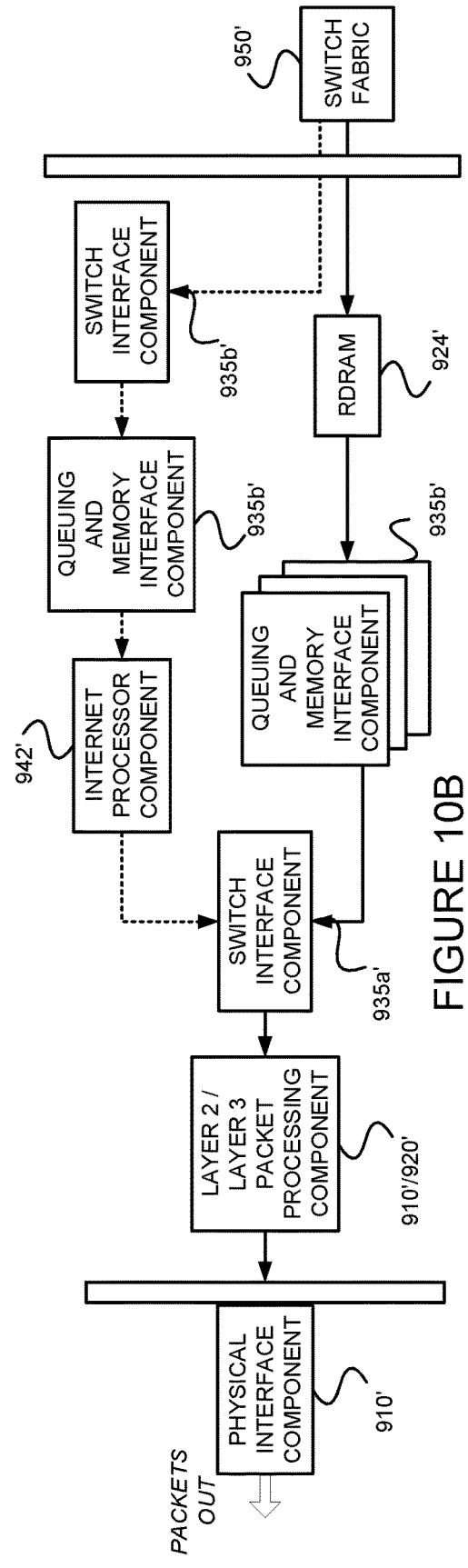

PATH MONITORING SYSTEM (PMS) CONTROLLER OR INGRESS NODE BASED MULTIPROTOCAL LABEL SWITCHING (MPLS) PING AND TRACEROUTE IN INTER- AUTONOMOUS SYSTEM (AS) SEGMENT ROUTING (SR) NETWORKS

§ 1. BACKGROUND OF THE INVENTION

§ 1.1 Field of the Invention

The present description concerns testing communications networks. In particular, the present description concerns testing communications networks using a segment routing architecture. (See, e.g., "Segment Routing Architecture," Request for Comments 8402 (Internet Engineering Task Force, July 2018)(referred to as "RFC 8402" and incorporated herein by reference). For example, the present description concerns checking a label switched path spanning more than one Autonomous System (AS).

§ 1.2 Background Information

§ 1.2.1 Segment Routing (SR) and the Communication of Segment Identifiers (SIDs)

In certain network deployments, network nodes under a single ownership or under a single administration are spread across different Autonomous Systems (ASes) to facilitate ease of management. Multiple AS network design may also result from network mergers and acquisitions. In such scenarios, connectivity across the different ASes can be established using Segment Routing. (Recall, e.g., RFC 8402.) Segment Routing also provides an easy and efficient way to provide interconnectivity in a large scale network as described in the Request for Comments (RFC) draft "Interconnecting Millions of Endpoints with Segment Routing," draft-filsfils-spring-large-scale-interconnect-13 (Internet Engineering Task Force, Mar. 5, 2019) (incorporated herein by reference).

FIG. 1 illustrates an example inter-AS segment routing (SR) network 100. In FIG. 1, "PE" denotes a provider edge router, "P" denotes a provider router, and "ASBR" denotes an AS border router. AS1 and AS2 are SR-enabled with node-segment identifiers (Node-SIDS) and adjacency segment identifiers (Adj-SIDS) advertised using an interior gateway protocol (IGP) such as open shortest path first (OSPF) or intermediate system-intermediate system (IS-IS). In the example network 100, the ASBRs advertise border gateway protocol (BGP) egress-peer-engineering segment identifiers (EPE SIDs) for the inter-AS links. The topology of AS1 and of AS2 are advertised, via BGP-LS, to a path monitoring system (PMS) controller. The EPE-SIDs are also advertised via BGP-LS, as described in the RFC draft, "BGP-LS extensions for Segment Routing BGP Egress Peer Engineering," draft-ietf-idr-bgpls-segment-routing-epe-18" (IETF, Mar. 24, 2019)(incorporated herein by reference).

The PMS controller acquires the complete (of the network topology of both ASes and their interconnections) database information and uses it to build end-to-end (e-2-e) traffic-engineered (TE) paths. The TE paths are downloaded from the PMS controller to ingress PE1, for example via netconf/bgp-sr-te or the "Path Computation Element (PCE) Protocol (PCEP)," Request for Comments 5440, 7896, 8253 and 8356 (Internet Engineering Task Force) (all four incorporated herein by reference). The head-end node PE1 may also (or instead) acquire the complete database using BGP-LS.

The following notation is used for various types of SIDs. Node-SIDs are denoted with an "N-" prefix and the node (e.g., N-PE1, N-P1, N-P2, N-ASBR1, N-ASBR2, etc.). Adjacency SIDs (Adj-SIDs) are denoted with an "Adj-" prefix and include both nodes of the adjacency (e.g., Adj-PE1-P1, Adj-P1-P2, etc.). Egress-per-engineering SIDS (EPE-SIDs) are denoted with an "EPE-" prefix and include both border routers (e.g., EPE-ASBR1-ASBR2, EPE-ASBR4-ASBR3, etc.). Finally, binding-SIDs are denoted with a "BSID{number}" prefix and include both nodes of the binding (e.g., BSID1-ASBR3-PE4, BSID2-ASBR3-ASBR4, etc.). Although not shown in FIG. 1, other types of SIDs, such as those described in RFC 8402 (e.g., prefix SIDs, anycast SIDs, BGP segments, etc.) can be used.

In the example network 100 of FIG. 1, e-2-e traffic engineered paths are built using Node-SIDs and Adj-SIDs. The paths within an AS may be represented using Binding-SIDs. Binding-SIDs are typically used to represent paths within an AS which will not change even if the actual path inside the AS changes due to changes in network topology. In this way, Binding-SIDs hide topology changes in one AS from another AS.

§ 1.2.2 Testing Networks Employing Segment Routing (SR)

Consider a TE path built from PE1 to PE4 with label stack as below.

N-P1, N-ASBR1, EPE-ASBR1-ASBR4, N-PE4.

It would be desirable for MPLS ping (See, e.g., Request for Comments 8029, "Detecting Multiprotocol Label Switched (MPLS) Data-Plane Failures" (Internet Engineering Task Force, March 2017) (referred to as "RFC 8029" and incorporated herein by reference).) to be able to verify end-to-end connectivity. It would also be desirable for traceroute to validate a TE path (i.e., packet is following the path specified by controller/PCEP) and verify that the control plane and data plane are in sync.

However, in SR networks, e-2-e paths can be easily built across different ASes using Node-SIDs, adj-SIDs, EPE-SIDs, etc. Unfortunately, it is not possible to run MPLS ping and traceroute functionality on such paths to verify basic connectivity and fault isolation, respectively. This is because with existing MPLS ping and traceroute mechanisms, a reply to the MPLS echo request comes via the Internet protocol (IP), but there is no IP-connectivity for the return path from the remote-end to the source of the ping packet over the different segments (across different ASes) of the SR network. (Note that MPLS "ping" may be used interchangeably in this description with MPLS "echo request" and "echo response.")

In view of the foregoing, it would be useful to provide an efficient and easy mechanism which can support Inter-AS MPLS ping and traceroute.

§ 1.2.2.1 Known Procedures for Testing Networks Employing Segment Routing (SR)

The RFC draft "Detecting MPLS Data Plane Failures in Inter-AS and inter-provider Scenarios," draft-nadeau-mpls-interas-lspping-00.txt (Internet Engineering Task Force, July 2005) (incorporated herein by reference) describes a solution based on advertising a new inter-AS type length value (TLV) containing stack of IP addresses (rather than MPLS labels). However, MPLS ping expects a return IP path from the ping destination to the source. This mechanism requires the return ping packet to reach the control plane and get software forwarded.

Request for Comments 8403, "A Scalable and Topology-Aware MPLS Data-Plane Monitoring System" (Internet Engineering Task Force, July 2018)(referred to as "RFC 8403" and incorporated herein by reference) defines continuity check and connectivity verification using path monitoring systems (PMSes) that reside outside the routing domain.

§ 2. SUMMARY OF THE INVENTION

This application describes mechanisms for testing inter-AS networks which are efficient and simple and can be easily deployed in SR networks.

Echo or traceroute functionality is supported in a path spanning multiple autonomous systems (ASes) having segment routing (SR) enabled, the path including an ingress node and an egress node, by: (a) obtaining a return label stack to reach the ingress node from either (A) the egress node, or (B) a transit node in the path; (b) obtaining a label stack to reach, from the ingress node, either (A) the egress node, or (B) the transit node; (c) generating a request message including the return label stack; and (d) sending the request message towards either (A) the egress node, or (B) the transit node using the label stack. The example method may further include: (e) receiving, by either (A) the egress node, or (B) the transit node, the request message, wherein the request message includes information for performing a validity check; (f) performing a validity check using the information included in the request message to generate validity information; (g) generating a reply message including the validity information and information from the return label stack; and (h) sending the reply message towards the ingress node using information from the return label stack included in the request message.

In at least some such example methods, the information for performing a validity check is a forwarding equivalency class (FEC) of the egress node.

In at least some such example methods, the ingress node is in a first one of the multiple ASes and the egress node is in a second one of the multiple ASes.

In at least some such example methods, the request message is an echo request packet, the return label stack is for reaching the ingress node from the egress node, and the echo request packet is sent towards the egress node using the label stack. The return label stack may be encoded in a return label stack type-length-value (TLV) ping or traceroute data structure, and the TLV data structure may include a field defining a number of elements in the return label stack. The return label stack may include at least two type of labels selected from a group of label types consisting of (A) an Interior Gateway Protocol (IGP) segment identifier, (B) an IGP node segment identifier, (C) an IGP adjacency segment identifier, (D) a border gateway protocol (BGP) segment identifier, and (E) a binding segment identifier.

In at least some such example methods, the request message is an traceroute request packet, and the traceroute request packet includes a time to live (TTL) value which is set such that the traceroute request packet reaches either (A) a transit node of the path, or (B) the egress node. The return label stack may be encoded in a return label stack type-length-value (TLV) data structure. The TLV data structure may include a field defining a number of elements in the return label stack. The return label stack may include at least two type of labels selected from a group of label types consisting of (A) an Interior Gateway Protocol (IGP) segment identifier, (B) an IGP node segment identifier, (C) an IGP adjacency segment identifier, (D) a border gateway protocol (BGP) segment identifier, and (E) a binding segment identifier.

In at least some such example methods, the return label stack is obtained by the ingress node from a path monitoring system (PMS) controller outside the path.

Example embodiments consistent with the present description enable MPLs ping and traceroute procedures from a PMS controller and/or from head-end (also referred to as "ingress") nodes across inter-AS networks. MPLS ping expects a return IP path from the ping destination to the source. It is very difficult and cumbersome to build static-routes or generic routing encapsulation (GRE) tunnels to every end-point from the PMS controller. SR networks statically assign the labels to nodes and the PMS controller and/or head-end knows entire database. The return path can be built from the PMS controller by stacking labels for the return path.

A new type length value (TLV) data structure "Return Label Stack TLV" is defined. Each TLV contains a list of labels which may be a prefix SID, adjacency SID, binding SID, etc. An MPLS echo request should contain this TLV which defines reverse path to reach source from the destination.

§ 3. BRIEF DESCRIPTION OF THE DRAWINGS

FIGS. 4-6 illustrate example data structures which may be used, as message formats, for carrying MPLS ping and/or traceroute information in a manner consistent with the present description.

FIGS. 10A and 10B illustrate example packet forwarding operations of the example distributed ASICs of FIG. 9.

§ 4. DETAILED DESCRIPTION

The present description may involve novel methods, apparatus, message formats, and/or data structures for supporting Inter-AS MPLS ping and traceroute. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§ 4.1 Example Method(s)

Figure 2:
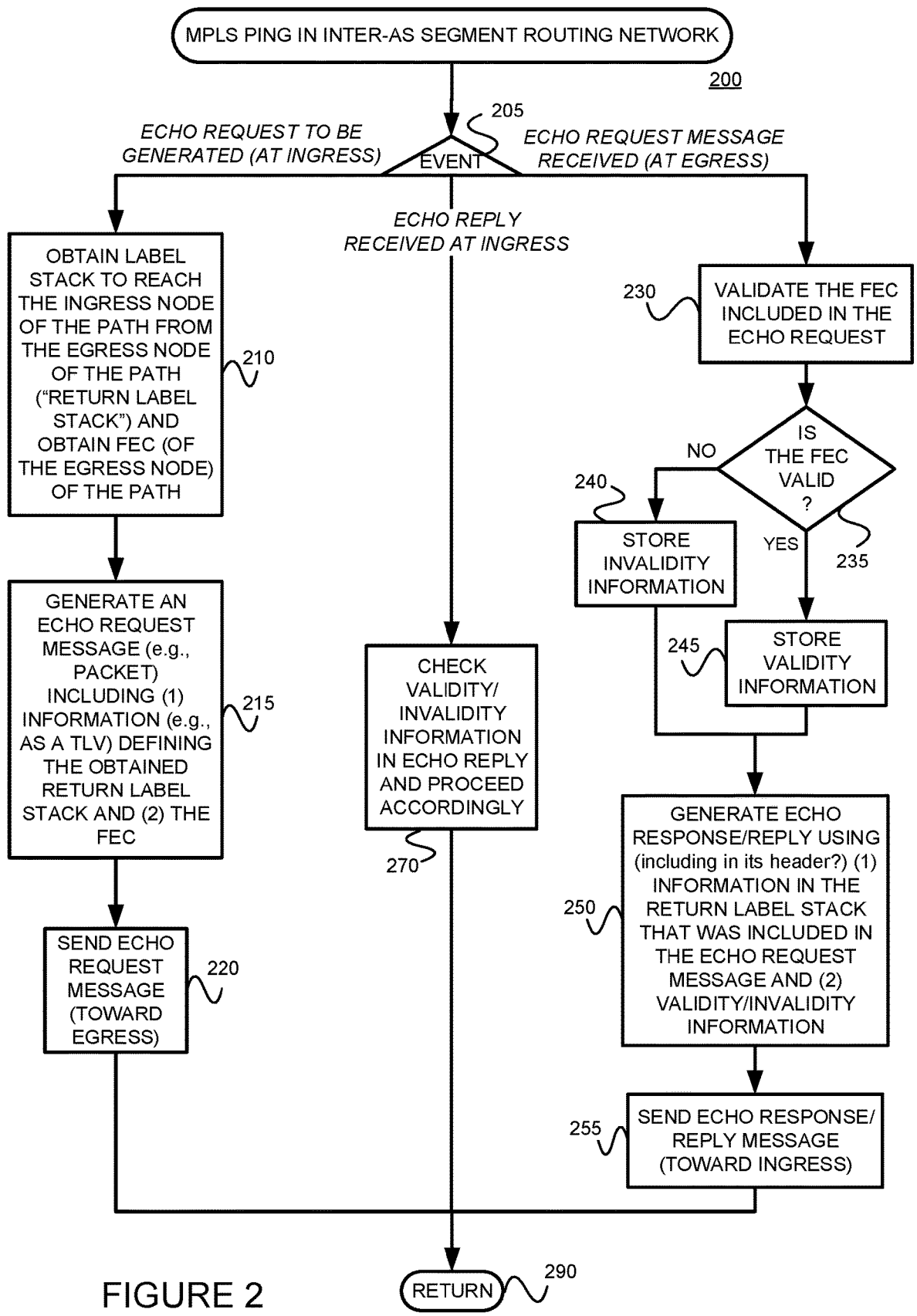
FIG. 2 is a flow diagram of an example method for performing an MPLS ping in an inter-AS SR network in a manner consistent with the present description.

FIG. 2 is a flow diagram of an example method 200 for performing an MPLS ping in an inter-AS segment routing (SR) network in a manner consistent with the present description. As shown, different branches of the example method 200 are performed in response to the occurrence of different events. (Event branch point 205)

Referring first to the left-most branch of FIG. 2, responsive to a trigger to generate an echo request (to test a path from the ingress node to an egress node of the path), the ingress node obtains a label stack to reach the ingress node (itself) from the egress node of the path (referred to as the "return label stack") and a forwarding equivalence class (FEC) corresponding to packets to be forwarded on the path. (Block 210) (Note that the FEC can be used to define the LSP. In the case of SR-LSPs, every label in the label-stack has separate FEC TLV. (See, e.g., "Label Switched Path (LSP) Ping/Traceroute for Segment Routing (SR) IGP-Prefix and IGP-Adjacency Segment Identifiers (SIDs) with MPLS Data Planes," Request for Comments 8287 (Internet Engineering Task Force, December 2017)(Referred to as "RFC 8287" and incorporated herein by reference.)) The method 200 generates an echo request (also referred to as a "ping") message (e.g., a packet) including (1) information (e.g., as a TLV) defining the obtained return label stack and (2) the FEC (or more specifically, the top label associated with the FEC). (Block 215) The example method 200 then sends the echo request message towards the egress node of the path (Block 220) before the example method returns. (Node 290)

Referring next to the right-most branch of FIG. 2, responsive to receiving the echo request (e.g., at the egress node of the path), the FEC included in the echo request message is checked for validity. (Block 230) If the FEC is not valid (Decision 235, NO), the example method 200 stores invalidity information (e.g., sets a flag to invalid). (Block 240) If, on the other hand, the FEC is valid (Decision 235, YES), the example method 200 stores validity information (e.g., sets a flag to valid). (Block 245) The example method 200 then generates an echo response message (e.g., packet) using (1) information in the return label stack that was included in the echo request message and (2) the stored validity/invalidity information. (Block 250) The echo reply message is then sent towards the ingress (e.g., using the top label in the return label stack) (Block 255) before the example method 200 returns. (Node 290) Although not shown, if the echo request message is received by a transit node of the path (i.e., a node other than the egress node of the path), it is simply forwarded towards the egress node.

Referring now to the middle branch of FIG. 2, in the event that an echo reply is received by the ingress node of the path being tested, the validity/invalidity information in the echo reply is checked and further processing is performed accordingly. (Block 270) Note that the echo reply packet will be an MPLS packet with label stack. On non-ingress (e.g., "transit") routers, this echo reply MPLS packet is simply processed like any normal MPLS packet. Consequently, since the echo-reply header will be below (that is, encapsulated by) the MPLS header, it will not be examined by the "transit" routers on return path. This advantageously avoids unnecessary processing by the transit routers on the return path.

Figure 3:
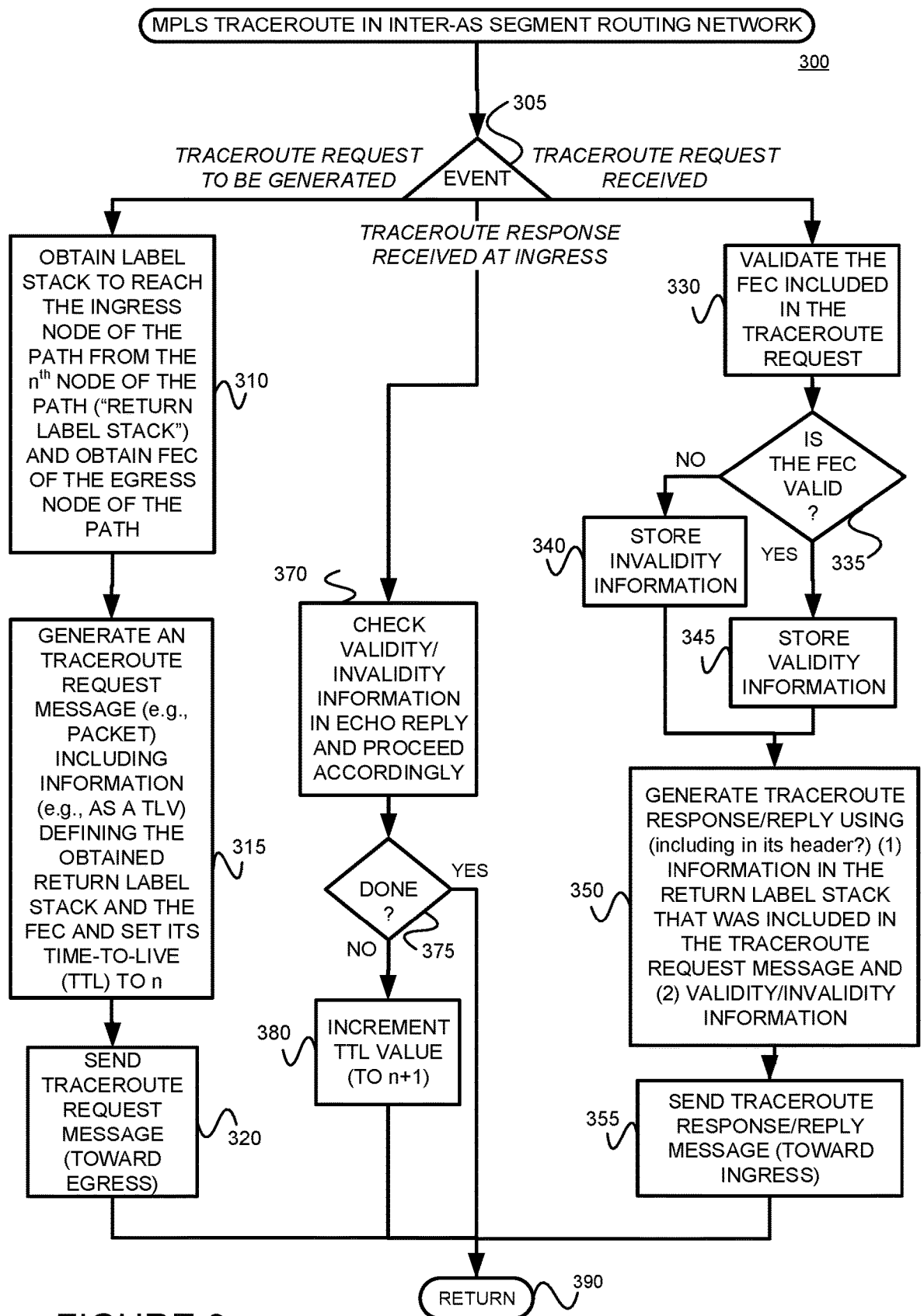
FIG. 3 is a flow diagram of an example method for performing an MPLS traceroute in an inter-AS SR network in a manner consistent with the present description.

FIG. 3 is a flow diagram of an example method 300 for performing an MPLS traceroute in an inter-AS segment routing network in a manner consistent with the present description. As shown, different branches of the example method 305 are performed in response to the occurrence of different events. (Event branch point 305)

Referring first to the left-most branch of FIG. 3, responsive to a trigger to generate an traceroute message (to test a path from the ingress node to an egress node of the path, including each label hop of the path), the ingress node obtains a label stack to reach the ingress node (itself) from the $n^{th}$ node of the path (referred to as the "return label stack") and a forwarding equivalence class (FEC) corresponding to the label (in case of traceroute, as opposed to the FEC corresponding to the egress router in case of MPLS ping). (Block 310) The method 300 generates a traceroute message (e.g., a packet) including (1) information (e.g., as a TLV) defining the obtained return label stack and (2) the FEC, where the traceroute message has a time to live (TTL) set to n. (Block 315) The example method 300 then sends the traceroute message towards the egress node (or towards the $n^{th}$ node) of the path (Block 320) before the example method 300 returns. (Node 390)

Referring next to the right-most branch of FIG. 3, responsive to receiving the traceroute message (e.g., at the egress node or $n^{th}$ node of the path, when the TTL of the traceroute packet is zero), the FEC included in the traceroute message is checked for validity. (Block 330) If the FEC is not valid (Decision 335, NO), the example method 300 stores invalidity information (e.g., sets a flag to invalid). (Block 340) If, on the other hand, the FEC is valid (Decision 335, YES), the example method 300 stores validity information (e.g., sets a flag to valid). (Block 345) The example method 300 then generates an echo traceroute response message (e.g., packet) using (1) information in the return label stack that was included in the traceroute message and (2) the stored validity/invalidity information. (Block 350) The traceroute response message is then sent towards the ingress (e.g., using the top label in the return label stack) (Block 355) before the example method 300 returns. (Node 390) Although not shown, if the echo request message is received by a transit node of the (partial) path (i.e., a node other than the egress node (or other than the $n^{th}$ node of the path), in which case, the TTL will not yet be zero), it is simply forwarded towards the egress node.

Referring now to the middle branch of FIG. 3, in the event that traceroute response message is received by the ingress node of the path being tested, the validity/invalidity information in the echo reply is checked and further processing is performed accordingly. (Block 370) For example, if the entire path being tested has not been completely tested (i.e., if the egress node is beyond the $n^{th}$ node), n is incremented and the TTL for the next traceroute request message is set to the new value for n.

Figure 1:
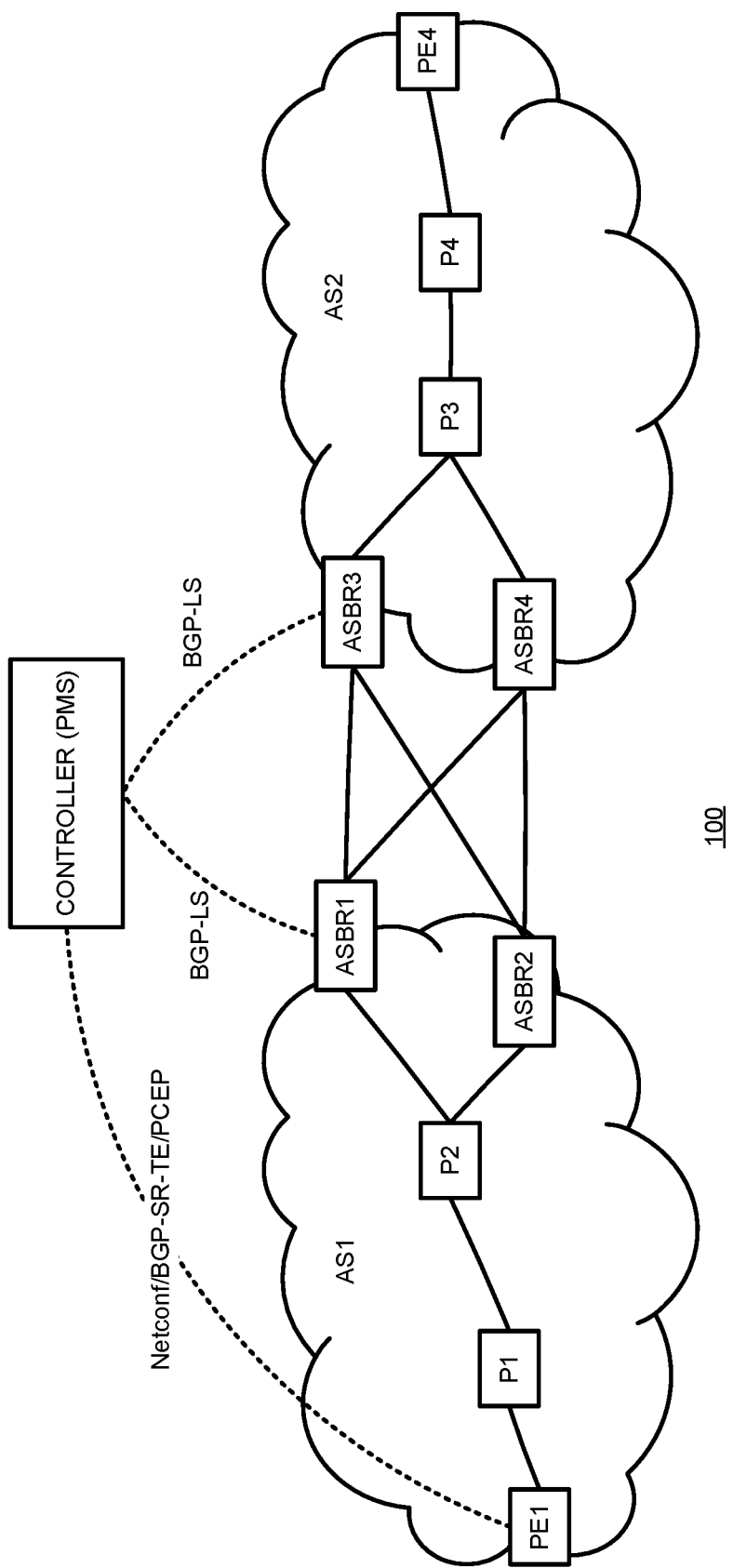
FIG. 1 illustrates an example inter-AS segment routing (SR) network in which example embodiments consistent with the present description may be used.

Referring back to block 210 and 310, the "return label stack" may be computed (at least in part) by the ingress node of the path being tested. However, the ingress node might not have knowledge of the network topology beyond the AS to which it belongs. Referring back to FIG. 1, a PMS controller may provide such necessary information. For example, the PMS controller may determine the entire return label stack. Alternatively, the controller may determine a part of the return label stack (with the ingress node determining a part of the label stack to be used within its AS).

Referring back to blocks 215 and 315, the echo request message and traceroute message may include a label stack to reach the egress node of the path (or to reach the $n^{th}$ node of the partial path). That is, the label stack is used to forward the echo request message or traceroute message down the path being tested. The packet will be sent to the router's control plane on every hop when the packet's TTL expires. The TTL is incremented by one every-time to make sure next node on the path is visited. The return label stack may be included within the echo request message or traceroute message as a new TLV, such as the example TLV(s) described in § 4.2 below.

§ 4.2 Example Message(s)

As just noted above, the return label stack may be included within the echo request message or traceroute message as a new TLV "Return Label Stack TLV." Each TLV contains a list of labels which may be a prefix-SID, adjacency-SID, binding-SID, etc. An example MPLS echo request message or MPLS traceroute message consistent with the present description should contain this TLV, which defines reverse path to reach source from the destination. FIGS. 4-6 illustrate example data structures which may be used for carrying MPLS ping and/or traceroute information in a manner consistent with the present description.

FIG. 4 illustrates details of an example TLV 400 (also referred to as a IPv4 or IPv6 Label stack TLV). The type field 410 may be 16 bits and may be defined (or assigned by the Internet Assigned Numbers Authority (IANA)). The 16-bit length field 420 includes a value specifying the length of the TLV including a TLV header. The 16-bit number of elements in set field 430 includes a value indicating how may labels (for the return label stack) are included. That is, the return label stack may include a set of one or more IPv4 or IPv6 addresses and/or labels, and the number of elements in set field 430 specifies how many.

Referring to both FIGS. 4 and 5, the flags field 440 may include a one-bit flag (F) which is set to 0 for IPv4 and set to 1 for IPv6.

Referring back to FIG. 4, the IPv4/IPv6 Address field 450 defines the node to be traversed, while the label value defines the label to reach to the address in SR network. The value in the IPv4/IPv6 Address field 450 may be NULL. The 20-bit label field 460 includes information that may be used to build the return (i.e., echo reply or traceroute reply) packet. The first label in the label stack represents the top-most label that should be encoded in the return packet.

FIG. 6 illustrates an IPv6 return SRH TLV consistent with the present description. For IPv6-only networks with SRv6 data plane deployments, the return path may be encoded using IPv6 addresses which should be used to build the return packet SRH header.

§ 4.3 Example Apparatus

Figure 7:
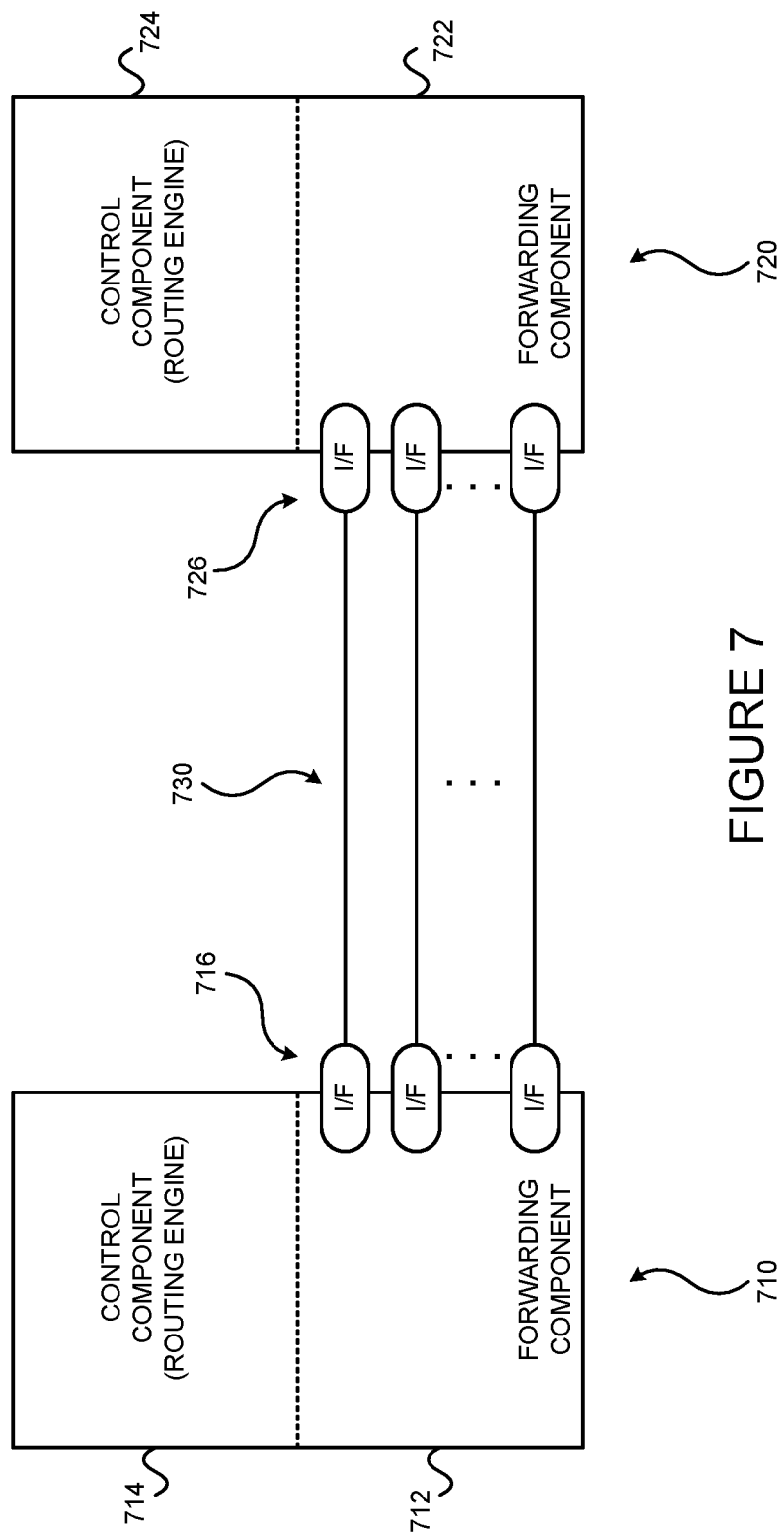
FIG. 7 illustrates an example environment including two systems coupled via communications links.

FIG. 7 illustrates two data forwarding systems 710 and 720 coupled via communications links 730. The links may be physical links or "wireless" links. The data forwarding systems 710,720 may be nodes, such as routers for example. If the data forwarding systems 710,720 are example routers, each may include a control component (e.g., a routing engine) 714,724 and a forwarding component 712,722. Each data forwarding system 710,720 includes one or more interfaces 716,726 that terminate one or more communications links 730. The example method 200 and/or 300 described above may be implemented in the control component 714/724 of devices 710/720.

As just discussed above, and referring to FIG. 8, some example routers 800 include a control component (e.g., routing engine) 810 and a packet forwarding component (e.g., a packet forwarding engine) 890.

The control component 810 may include an operating system (OS) kernel 820, routing protocol process(es) 830, label-based forwarding protocol process(es) 840, interface process(es) 850, configuration API(s) 852, a user interface (e.g., command line interface) process(es) 854, programmatic API(s), 856, and chassis process(es) 870, and may store routing table(s) 839, label forwarding information 845, configuration information in a configuration database(s) 860 and forwarding (e.g., route-based and/or label-based) table(s) 880. As shown, the routing protocol process(es) 830 may support routing protocols such as the routing information protocol ("RIP") 831, the intermediate system-to-intermediate system protocol ("ISIS") 832, the open shortest path first protocol ("OSPF") 833, the enhanced interior gateway routing protocol ("EIGRP") 834 and the border gateway protocol ("BGP") 835, and the label-based forwarding protocol process(es) 840 may support protocols such as BGP 835, the label distribution protocol ("LDP") 836 and the resource reservation protocol ("RSVP") 837. One or more components (not shown) may permit a user to interact, directly or indirectly (via an external device), with the router configuration database(s) 860 and control behavior of router protocol process(es) 830, the label-based forwarding protocol process(es) 840, the interface process(es) 850, and the chassis process(es) 870. For example, the configuration database(s) 860 may be accessed via SNMP 885, configuration API(s) (e.g. the Network Configuration Protocol (NetConf), the Yet Another Next Generation (e) protocol, etc.) 852, a user command line interface (CLI) 854, and/or programmatic API(s) 856. Control component processes may send information to an outside device via SNMP 885, syslog, streaming telemetry (e.g., Google's network management protocol (gNMI), the IP Flow Information Export (IPFIX) protocol, etc.)), etc. Similarly, one or more components (not shown) may permit an outside device to interact with one or more of the router protocol process(es) 830, the label-based forwarding protocol process(es) 840, the interface process(es) 850, configuration database(s) 860, and the chassis process(es) 870, via programmatic API(s) (e.g. gRPC) 856. Such processes may send information to an outside device via streaming telemetry.

The packet forwarding component 890 may include a microkernel 892, interface process(es) 893, distributed ASICs 894, chassis process(es) 895 and forwarding (e.g., route-based and/or label-based) table(s) 896.

Figure 8:
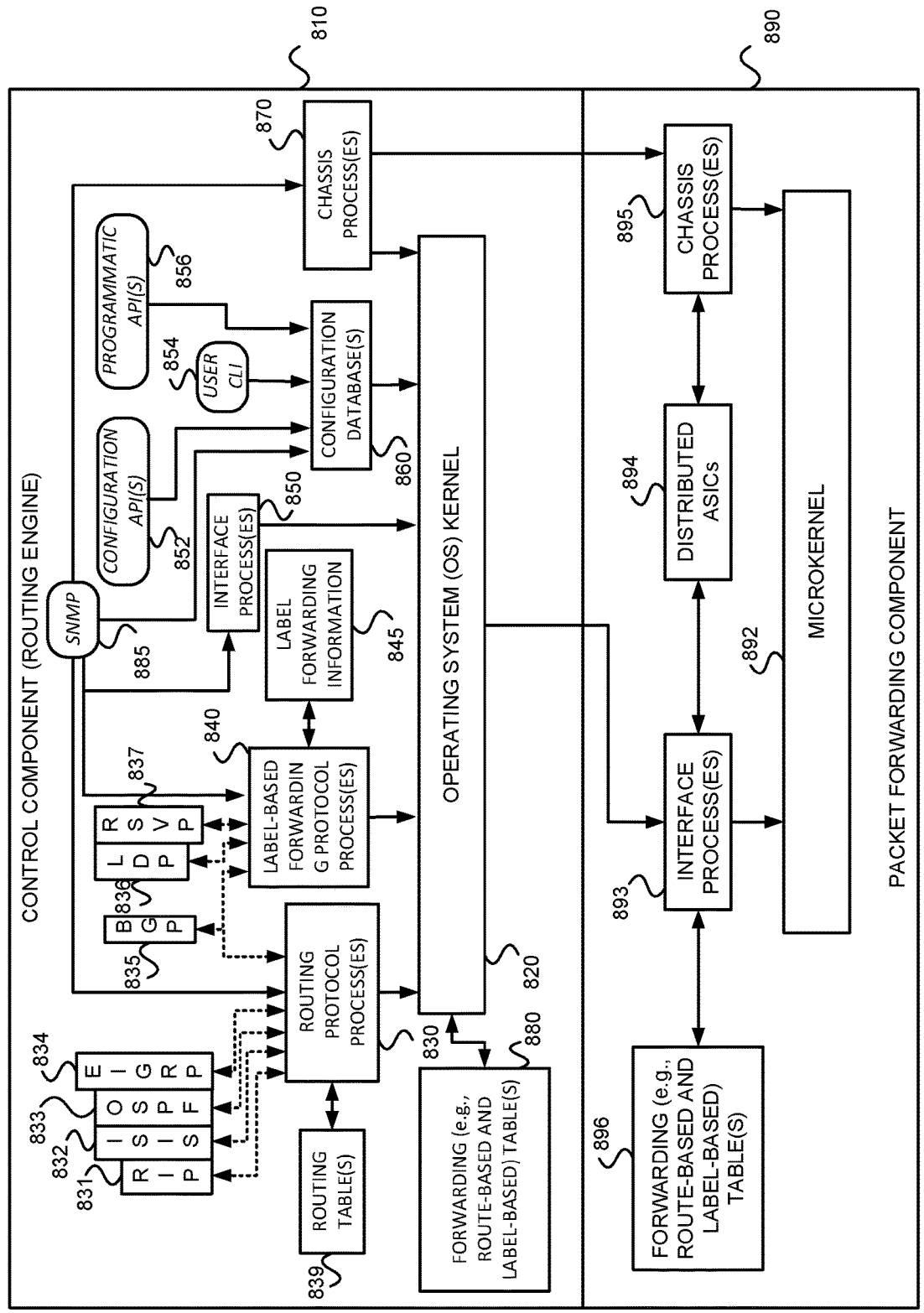
FIG. 8 is a block diagram of an example router on which the example methods of the present description may be implemented.

In the example router 800 of FIG. 8, the control component 810 handles tasks such as performing routing protocols, performing label-based forwarding protocols, control packet processing, etc., which frees the packet forwarding component 890 to forward received packets quickly. That is, received control packets (e.g., routing protocol packets and/or label-based forwarding protocol packets) are not fully processed on the packet forwarding component 890 itself, but are passed to the control component 810, thereby reducing the amount of work that the packet forwarding component 890 has to do and freeing it to process packets to be forwarded efficiently. Thus, the control component 810 is primarily responsible for running routing protocols and/or label-based forwarding protocols, maintaining the routing tables and/or label forwarding information, sending forwarding table updates to the packet forwarding component 890, and performing system management. The example control component 810 may handle routing protocol packets, provide a management interface, provide configuration management, perform accounting, and provide alarms. The processes 830, 840, 850, 852, 854, 856, 860 and 870 may be modular, and may interact (directly or indirectly) with the OS kernel 820. That is, nearly all of the processes communicate directly with the OS kernel 820. Using modular software that cleanly separates processes from each other isolates problems of a given process so that such problems do not impact other processes that may be running. Additionally, using modular software facilitates easier scaling.

Still referring to FIG. 8, although shown separately, the example OS kernel 820 may incorporate an application programming interface ("API") system for external program calls and scripting capabilities. The control component 810 may be based on an Intel PCI platform running the OS from flash memory, with an alternate copy stored on the router's hard disk. The OS kernel 820 is layered on the Intel PCI platform and establishes communication between the Intel PCI platform and processes of the control component 810. The OS kernel 820 also ensures that the forwarding tables 896 in use by the packet forwarding component 890 are in sync with those 880 in the control component 810. Thus, in addition to providing the underlying infrastructure to control component 810 software processes, the OS kernel 820 also provides a link between the control component 810 and the packet forwarding component 890.

Referring to the routing protocol process(es) 830 of FIG. 8, this process(es) 830 provides routing and routing control functions within the platform. In this example, the RIP 831, ISIS 832, OSPF 833 and EIGRP 834 (and BGP 835) protocols are provided. Naturally, other routing protocols may be provided in addition, or alternatively. Similarly, the label-based forwarding protocol process(es) 840 provides label forwarding and label control functions. In this example, the LDP 836 and RSVP 837 (and BGP 835) protocols are provided. Naturally, other label-based forwarding protocols (e.g., MPLS) may be provided in addition, or alternatively. In the example router 800, the routing table(s) 839 is produced by the routing protocol process(es) 830, while the label forwarding information 845 is produced by the label-based forwarding protocol process(es) 840.

Still referring to FIG. 8, the interface process(es) 850 performs configuration of the physical interfaces (Recall, e.g., 716 and 726 of FIG. 7.) and encapsulation.

The example control component 810 may provide several ways to manage the router. For example, it 810 may provide a user interface process(es) 860 which allows a system operator to interact with the system through configuration, modifications, and monitoring. The SNMP 885 allows SNMP-capable systems to communicate with the router platform. This also allows the platform to provide necessary SNMP information to external agents. For example, the SNMP 885 may permit management of the system from a network management station running software, such as Hewlett-Packard's Network Node Manager ("HP-NNM"), through a framework, such as Hewlett-Packard's OpenView. Further, as already noted above, the configuration database(s) 860 may be accessed via SNMP 885, configuration API(s) (e.g. NetConf, YANG, etc.) 852, a user CLI 854, and/or programmatic API(s) 856. Control component processes may send information to an outside device via SNMP 885, syslog, streaming telemetry (e.g., gNMI, IPFIX, etc.), etc. Similarly, one or more components (not shown) may permit an outside device to interact with one or more of the router protocol process(es) 830, the label-based forwarding protocol process(es) 840, the interface process(es) 850, and the chassis process(es) 870, via programmatic API(s) (e.g., gRPC) 856. Such processes may send information to an outside device via streaming telemetry. Accounting of packets (generally referred to as traffic statistics) may be performed by the control component 810, thereby avoiding slowing traffic forwarding by the packet forwarding component 890.

Although not shown, the example router 800 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 854 via a console port, an auxiliary port, and/or a management Ethernet port.

The packet forwarding component 890 is responsible for properly outputting received packets as quickly as possible. If there is no entry in the forwarding table for a given destination or a given label and the packet forwarding component 890 cannot perform forwarding by itself, it 890 may send the packets bound for that unknown destination off to the control component 810 for processing. The example packet forwarding component 890 is designed to perform Layer 2 and Layer 3 switching, route lookups, and rapid packet forwarding.

As shown in FIG. 8, the example packet forwarding component 890 has an embedded microkernel 892, interface process(es) 893, distributed ASICs 894, and chassis process(es) 895, and stores a forwarding (e.g., route-based and/or label-based) table(s) 896. The microkernel 892 interacts with the interface process(es) 893 and the chassis process(es) 895 to monitor and control these functions. The interface process(es) 892 has direct communication with the OS kernel 820 of the control component 810. This communication includes forwarding exception packets and control packets to the control component 810, receiving packets to be forwarded, receiving forwarding table updates, providing information about the health of the packet forwarding component 890 to the control component 810, and permitting configuration of the interfaces from the user interface (e.g., CLI) process(es) 854 of the control component 810. The stored forwarding table(s) 896 is static until a new one is received from the control component 810. The interface process(es) 893 uses the forwarding table(s) 896 to look up next-hop information. The interface process(es) 893 also has direct communication with the distributed ASICs 894. Finally, the chassis process(es) 895 may communicate directly with the microkernel 892 and with the distributed ASICs 894.

In the example router 800, the example methods 200 and/or 300 consistent with the present disclosure may be implemented in an MPLS OAM module which processes echo request and reply.

Figure 9:
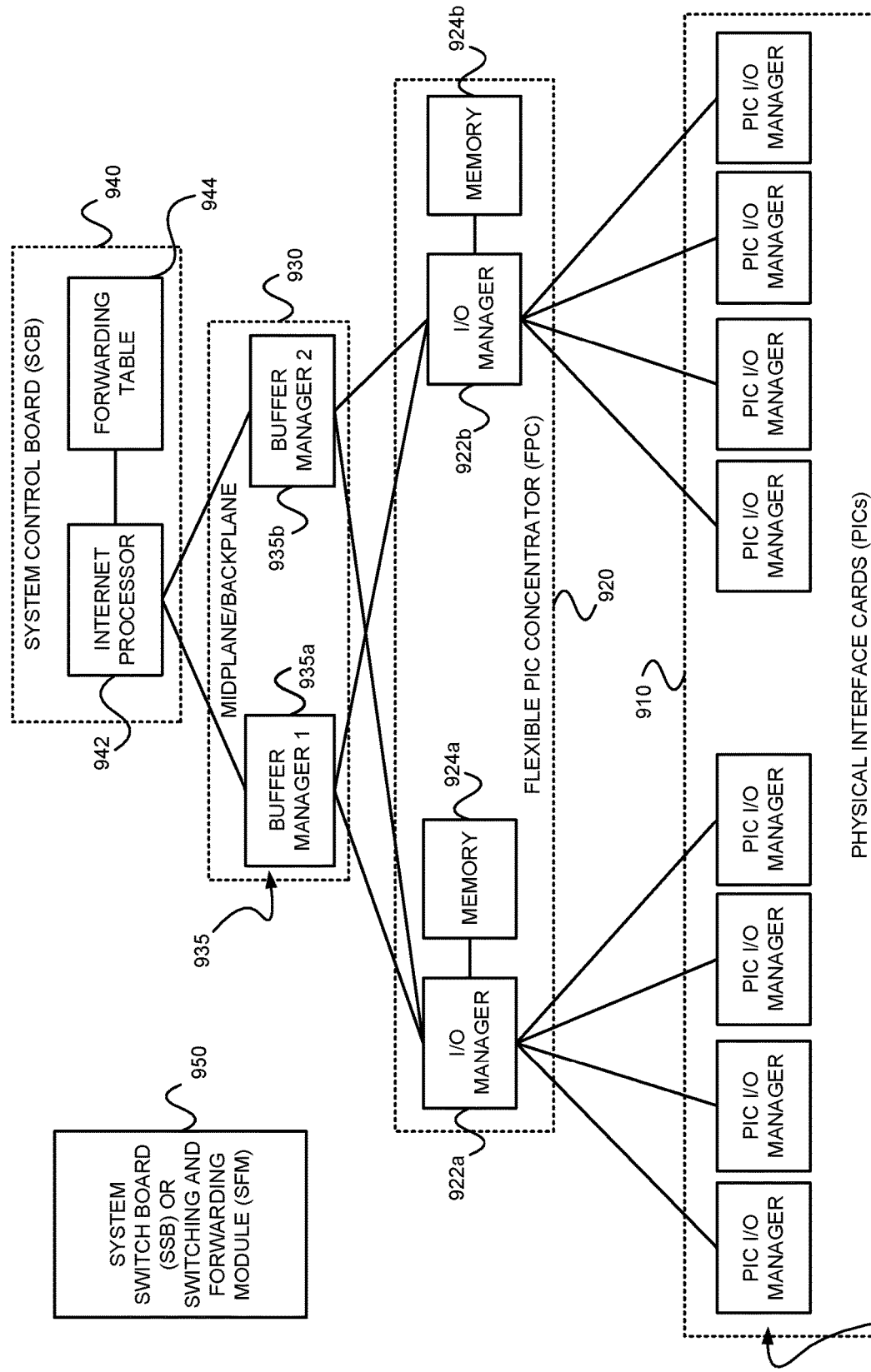
FIG. 9 is a block diagram of example distributed application specific integrated circuits ("ASICs") that may be provided in the example router of FIG. 8.

Referring back to distributed ASICs 894 of FIG. 8, FIG. 9 is an example of how the ASICS may be distributed in the packet forwarding component 890 to divide the responsibility of packet forwarding. As shown in FIG. 9, the ASICs of the packet forwarding component 890 may be distributed on physical interface cards ("PICs") 910, flexible PIC concentrators ("FPCs") 920, a midplane or backplane 930, and a system control board(s) 940 (for switching and/or forwarding). Switching fabric is also shown as a system switch board ("SSB"), or a switching and forwarding module ("SFM") 950. Each of the PICs 910 includes one or more PIC I/O managers 915. Each of the FPCs 920 includes one or more I/O managers 922, each with an associated memory 924. The midplane/backplane 930 includes buffer managers 935*a*, 935*b*. Finally, the system control board 940 includes an internet processor 942 and an instance of the forwarding table 944 (Recall, e.g., 896 of FIG. 8).

Still referring to FIG. 9, the PICs 910 contain the interface ports. Each PIC 910 may be plugged into an FPC 920. Each individual PIC 910 may contain an ASIC that handles media-specific functions, such as framing or encapsulation. Some example PICs 910 provide SDH/SONET, ATM, Gigabit Ethernet, Fast Ethernet, and/or DS3/E3 interface ports.

An FPC 920 can contain from one or more PICs 910, and may carry the signals from the PICs 910 to the midplane/backplane 930 as shown in FIG. 9.

The midplane/backplane 930 holds the line cards. The line cards may connect into the midplane/backplane 930 when inserted into the example router's chassis from the front. The control component (e.g., routing engine) 810 may plug into the rear of the midplane/backplane 930 from the rear of the chassis. The midplane/backplane 930 may carry electrical (or optical) signals and power to each line card and to the control component 810.

The system control board 940 may perform forwarding lookup. It 940 may also communicate errors to the routing engine. Further, it 940 may also monitor the condition of the router based on information it receives from sensors. If an abnormal condition is detected, the system control board 940 may immediately notify the control component 810.

Referring to FIGS. 9, 10A and 10B, in some exemplary routers, each of the PICs 910,810' contains at least one I/O manager ASIC 915 responsible for media-specific tasks, such as encapsulation. The packets pass through these I/O ASICs on their way into and out of the router. The I/O manager ASIC 915 on the PIC 910,810' is responsible for managing the connection to the I/O manager ASIC 922 on the FPC 920,820', managing link-layer framing and creating the bit stream, performing cyclical redundancy checks (CRCs), and detecting link-layer errors and generating alarms, when appropriate. The FPC 920 includes another I/O manager ASIC 922. This ASIC 922 takes the packets from the PICs 910 and breaks them into (e.g., 64-byte) memory blocks. This FPC I/O manager ASIC 922 sends the blocks to a first distributed buffer manager (DBM) 935*a'*, decoding encapsulation and protocol-specific information, counting packets and bytes for each logical circuit, verifying packet integrity, and applying class of service (CoS) rules to packets. At this point, the packet is first written to memory. More specifically, the example DBM ASIC 935*a'* manages and writes packets to the shared memory 924 across all FPCs 920. In parallel, the first DBM ASIC 935*a'* also extracts information on the destination of the packet and passes this forwarding-related information to the Internet processor 942/842'. The Internet processor 942/842' performs the route lookup using the forwarding table 944 and sends the information over to a second DBM ASIC 935*b'*. The Internet processor ASIC 942/842' also collects exception packets (i.e., those without a forwarding table entry) and sends them to the control component 810. The second DBM ASIC 935*b'* then takes this information and the 64-byte blocks and forwards them to the I/O manager ASIC 922 of the egress FPC 920/820' (or multiple egress FPCs, in the case of multicast) for reassembly. (Thus, the DBM ASICs 935*a'* and 935*b'* are responsible for managing the packet memory 924 distributed across all FPCs 920/820', extracting forwarding-related information from packets, and instructing the FPC where to forward packets.)

The I/O manager ASIC 922 on the egress FPC 920/820' may perform some value-added services. In addition to incrementing time to live ("TTL") values and re-encapsulating the packet for handling by the PIC 910, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 922 on the egress FPC 920/820' may be responsible for receiving the blocks from the second DBM ASIC 935*b'*, incrementing TTL values, queuing a pointer to the packet, if necessary, before applying CoS rules, re-encapsulating the blocks, and sending the encapsulated packets to the PIC I/O manager ASIC 915.

Figure 11:
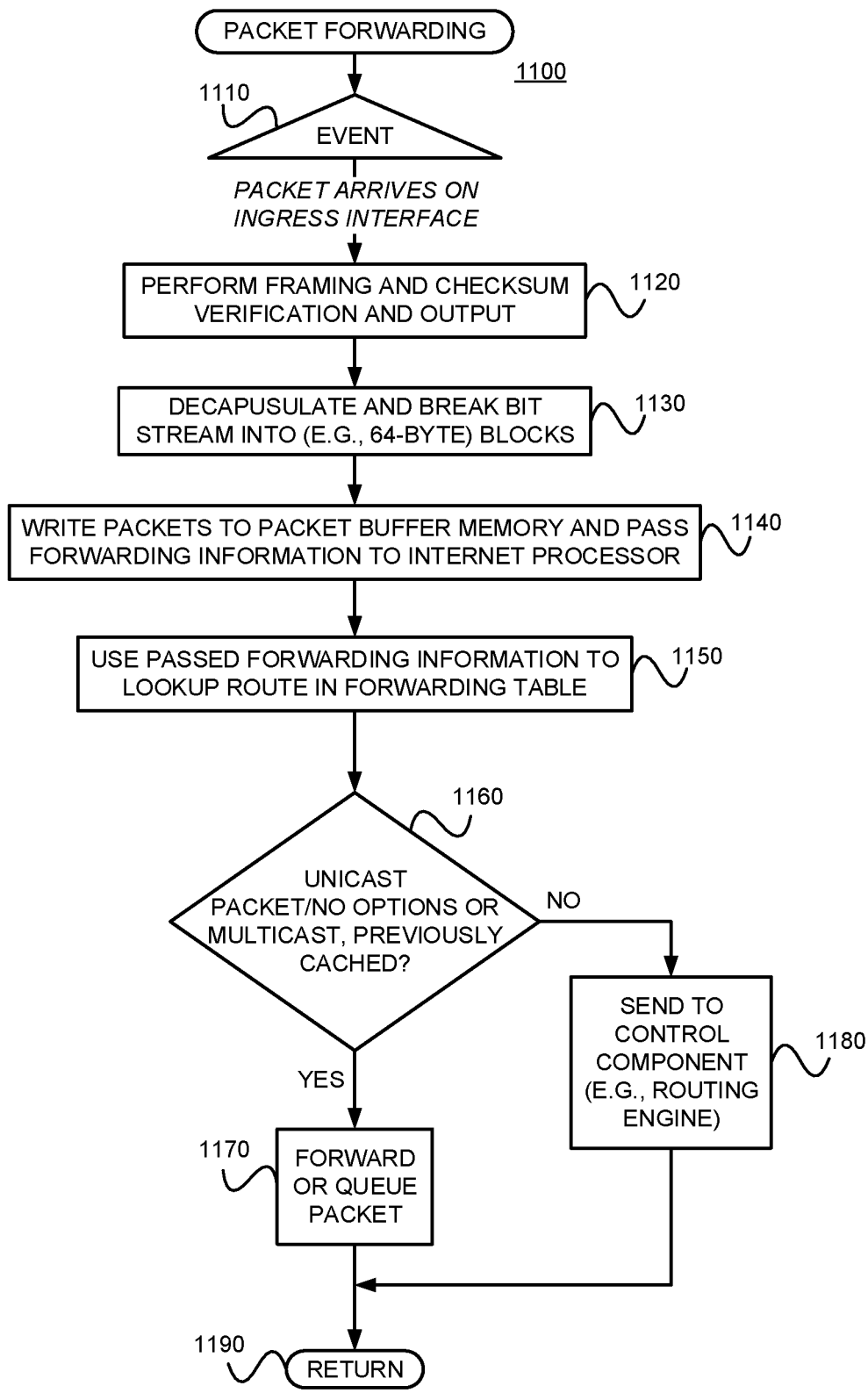
FIG. 11 is a flow diagram of an example packet forwarding method that may be implemented on any of the example routers of FIGS. 8 and 9.

FIG. 11 is a flow diagram of an example method 1100 for providing packet forwarding in the example router. The main acts of the method 1100 are triggered when a packet is received on an ingress (incoming) port or interface. (Event 1110) The types of checksum and frame checks that are required by the type of medium it serves are performed and the packet is output, as a serial bit stream. (Block 1120) The packet is then decapsulated and parsed into (e.g., 64-byte) blocks. (Block 1130) The packets are written to buffer memory and the forwarding information is passed on the Internet processor. (Block 1140) The passed forwarding information is then used to lookup a route in the forwarding table. (Block 1150) (Recall, e.g., FIG. 7.) Note that the forwarding table can typically handle unicast packets that do not have options (e.g., accounting) set, and multicast packets for which it already has a cached entry. Thus, if it is determined that these conditions are met (YES branch of Decision 1160), the packet forwarding component finds the next hop and egress interface, and the packet is forwarded (or queued for forwarding) to the next hop via the egress interface (Block 1170) before the method 1100 is left (Node 1190) Otherwise, if these conditions are not met (NO branch of Decision 1160), the forwarding information is sent to the control component 810 for advanced forwarding resolution (Block 1180) before the method 1100 is left (Node 1190).

Referring back to block 1170, the packet may be queued. Actually, as stated earlier with reference to FIG. 9, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 922 may send a request for the packet to the second DBM ASIC 935*b*. The DBM ASIC 935 reads the blocks from shared memory and sends them to the I/O manager ASIC 922 on the FPC 920, which then serializes the bits and sends them to the media-specific ASIC of the egress interface. The I/O manager ASIC 915 on the egress PIC 910 may apply the physical-layer framing, perform the CRC, and send the bit stream out over the link.

Referring back to block 1180 of FIG. 11, as well as FIG. 9, regarding the transfer of control and exception packets, the system control board 940 handles nearly all exception packets. For example, the system control board 940 may pass exception packets to the control component 810.

Although example embodiments consistent with the present disclosure may be implemented on the example routers of FIG. 7 or 8, embodiments consistent with the present disclosure may be implemented on communications network nodes (e.g., routers, switches, etc.) having different architectures. More generally, embodiments consistent with the present disclosure may be implemented on an example system 1200 as illustrated on FIG. 12.

Figure 12:
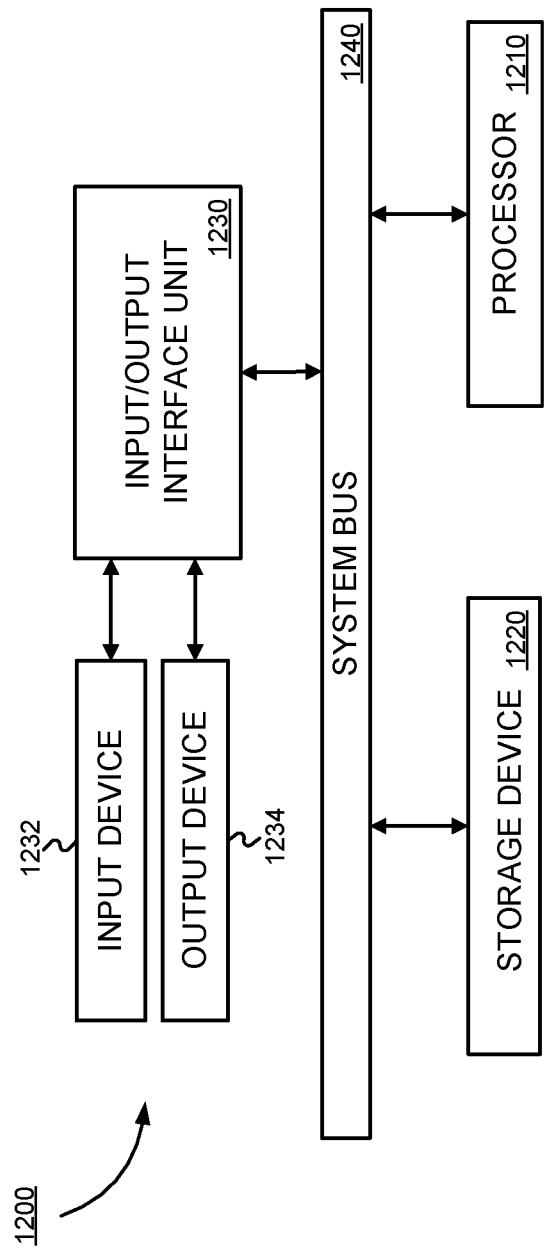
FIG. 12 is a block diagram of an example processor-based system that may be used to execute the example methods for processing

FIG. 12 is a block diagram of an exemplary machine 1200 that may perform one or more of the methods described, and/or store information used and/or generated by such methods. The exemplary machine 1200 includes one or more processors 1210, one or more input/output interface units 1230, one or more storage devices 1220, and one or more system buses and/or networks 1240 for facilitating the communication of information among the coupled elements. One or more input devices 1232 and one or more output devices 1234 may be coupled with the one or more input/output interfaces 1230. The one or more processors 1210 may execute machine-executable instructions (e.g., C or C++ running on the Linux operating system widely available from a number of vendors) to effect one or more aspects of the present disclosure. At least a portion of the machine executable instructions may be stored (temporarily or more permanently) on the one or more storage devices 1220 and/or may be received from an external source via one or more input interface units 1230. The machine executable instructions may be stored as various software modules, each module performing one or more operations. Functional software modules are examples of components which may be used in the apparatus described.

In some embodiments consistent with the present disclosure, the processors 1210 may be one or more microprocessors and/or ASICs. The bus 1240 may include a system bus. The storage devices 1220 may include system memory, such as read only memory (ROM) and/or random access memory (RAM). The storage devices 1220 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present disclosure (or components or modules thereof) might be implemented as stored program instructions executed by a processor. Such hardware and/or software might be provided in an addressed data (e.g., packet, cell, etc.) forwarding device (e.g., a switch, a router, etc.), a server, a laptop computer, desktop computer, a tablet computer, a mobile phone, or any device (e.g., a controller, and/or label switching router) that has computing and networking capabilities.

§ 4.4 Example Operations of Example Methods

Figure 13A:
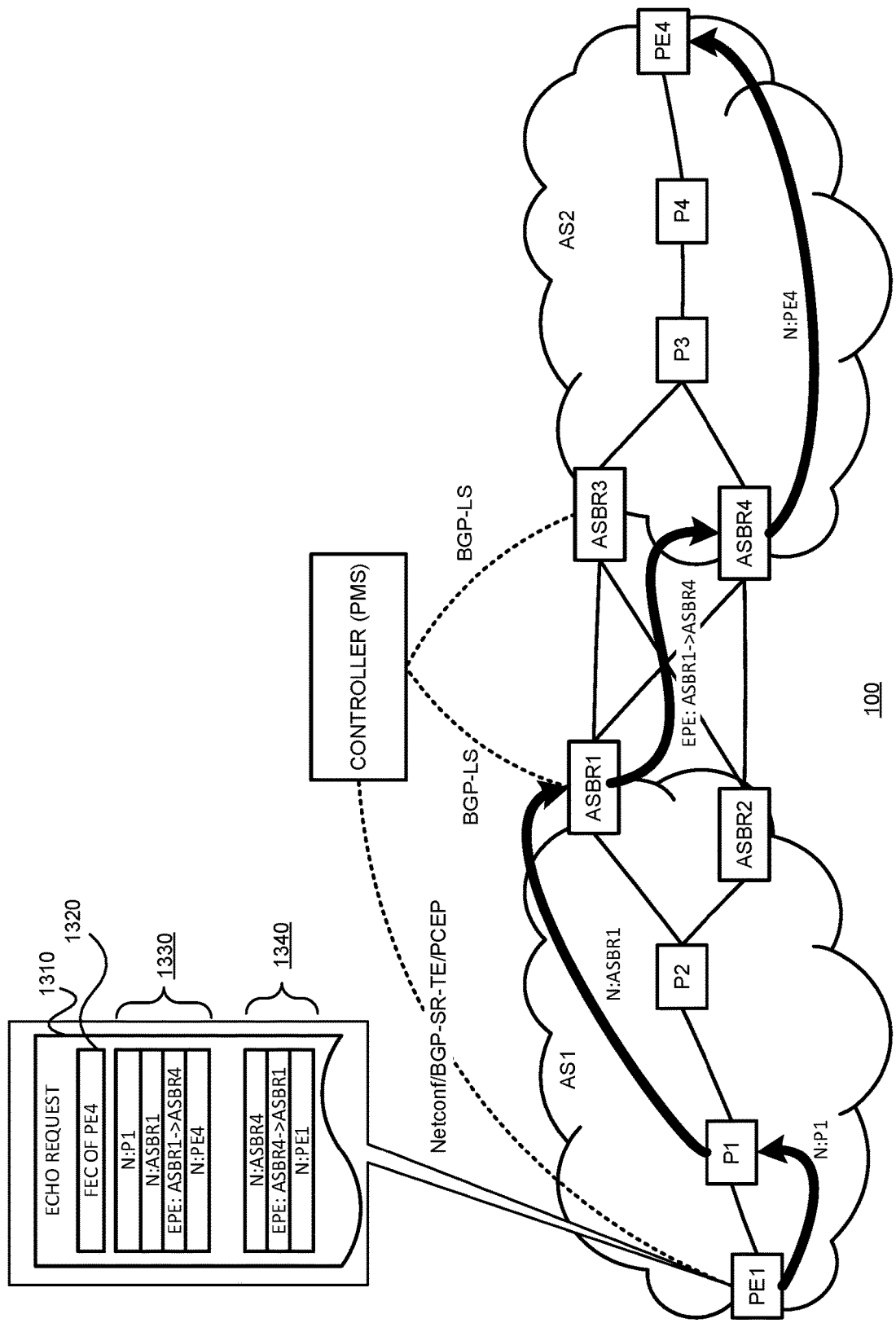
FIGS. 13A and 13B illustrate operations of an example MPLS ping method, consistent with the present description, in an inter-AS SR network.
Figure 13B:
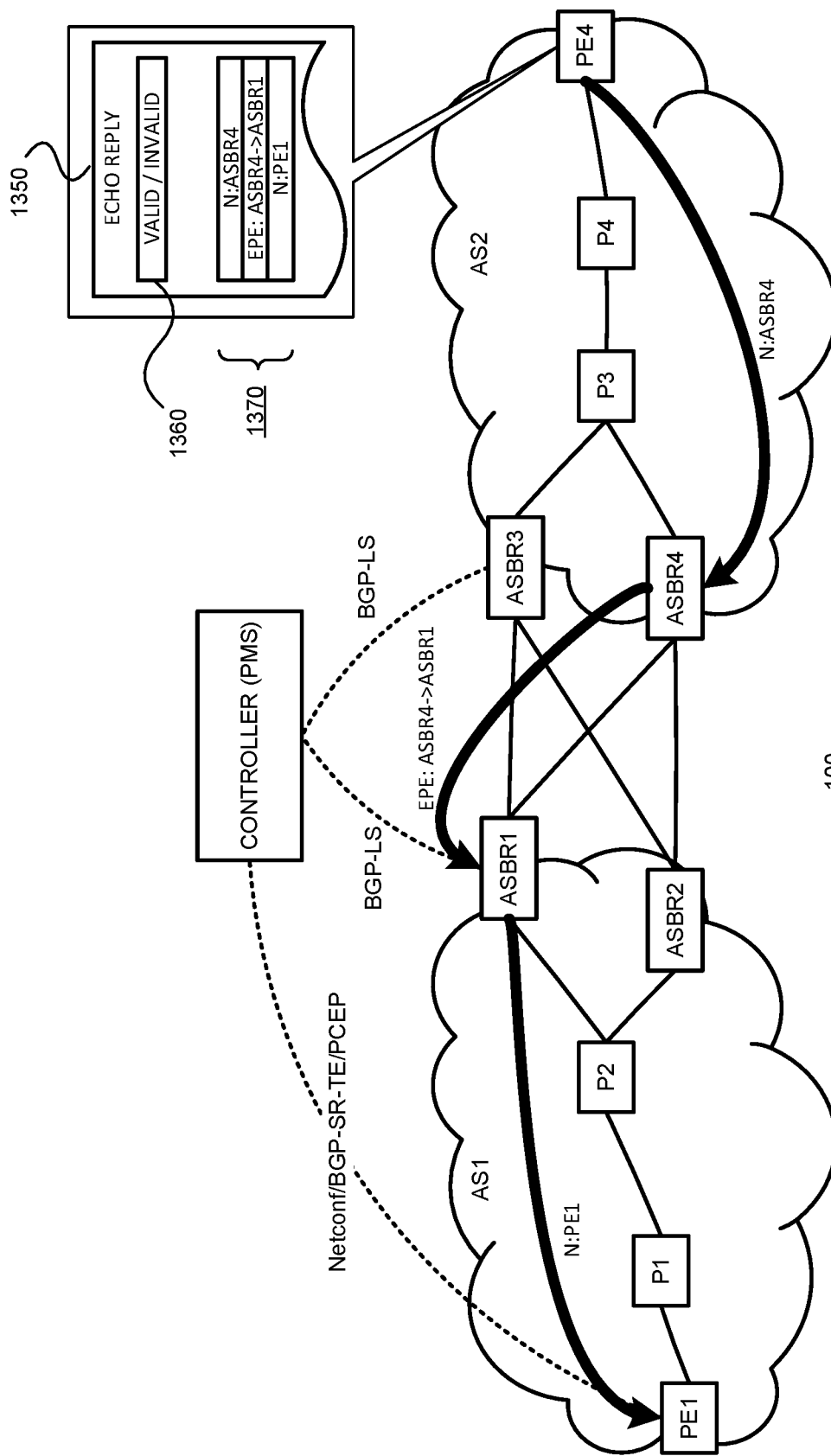

FIGS. 13A and 13B illustrate operations of an example MPLS ping method, consistent with the present description, in an inter-AS segment routing network. Assume that there is an MPLS label switched path from ingress edge node PE1 in AS1 to egress edge node PE4 in AS2.

Referring first to FIG. 13A, to construct the MPLS echo request 1310, PE1 needs a label stack 1330 to reach PE4 and the FEC of the PE4 1320. The label stack 1330 may be programmed by the controller. Alternatively, PE1 may have imported the whole topology information (including the topology of AS2) from BGP LS. RFC 8287 defines a new FEC for SR networks which can be included to the MPLS echo request 1310. However, in a typical deployment scenario, there will no IP connectivity from PE4 to PE1. Therefore, as shown, PE1 includes the return path from PE4 to PE1 in the MPLS echo request 1310 using multiple "Return label stack" TLV defined above. This is illustrated, in simplified form, as return label stack 1340. For example, an MPLS echo request from PE1 to PE4 may include three (3) labels in the return label stack TLV; namely N-ASBR4, EPE-ASBR4→ASBR1 and N-PE1.

Still referring to FIG. 13A, as shown by the heavy arrows, the information in the label stack 1330 is used to send the echo request message 1310 from PE1 to P1, then from P1 to ASBR1, then from ASBR1 to ASBR4, and finally from ASBR4 to PE4. As is known, a label may be popped off of the top of the stack 1330 at each hop. (Recall, e.g., 220 of FIG. 2.)

Referring back to block 210 of FIG. 2, if PE1 has the topology of the whole network (including the topology of AS2), it may calculate "return label stack" TLV using a traffic engineering database (TED), or a user may provide such return label stack information in the case of on-demand echo request initiated from PE1. Similarly, when the echo request is initiated from a (e.g., PMS) controller, the controller may construct the return label stack based on the knowledge of topology and connectivity of the return path.

Referring now to FIG. 13B, responsive to receiving the MPLS echo request 1310, PE4 first validates the FEC 1320 in the echo request 1310 (Recall, e.g., 230 of FIG. 3.) and prepares a label stack to send an echo reply message 1350 back to PE1 using information in the "return label stack." (See 1340 of FIG. 13A, 1370 of FIG. 13B and recall 250 of FIG. 2.) More specifically, PE4 builds the echo reply message 1350 (e.g., packet) with the label stack 1370 (e.g., in the packet header) and sends the echo reply back towards PE1.

(Recall, e.g., 255 of FIG. 2.) As shown by the heavy arrows in FIG. 13B, the label stack 1370 in the echo reply (which was generated from the return label stack 1340 in the echo request 1310) is used to forward the echo reply message 1350 from PE4 to ASBR4, then from ASBR4 to ASBR1, and finally from ASBR1 to PE1. As is known, a label may be popped from the top of the stack at each hop of the return path.

Thus, FIGS. 13A and 13B illustrate an example of the utility of the example method 200 of FIG. 2.

FIGS. 14A-14D illustrate operations of an example MPLS traceroute method, consistent with the present description, in an inter-AS segment routing network. The MPLS traceroute procedures are similar to MPLS echo, but, as is conventional, the time to live (TTL) value in the traceroute request is successively increased so that the traceroute message is sent to and returned from each hop of the label switched path. The ingress (or head end node) constructs the return label stack information and the egress node (or progressive downstream nodes) uses the return label stack to construct a label stack used in the traceroute reply (e.g., packet header).

Figure 14A:
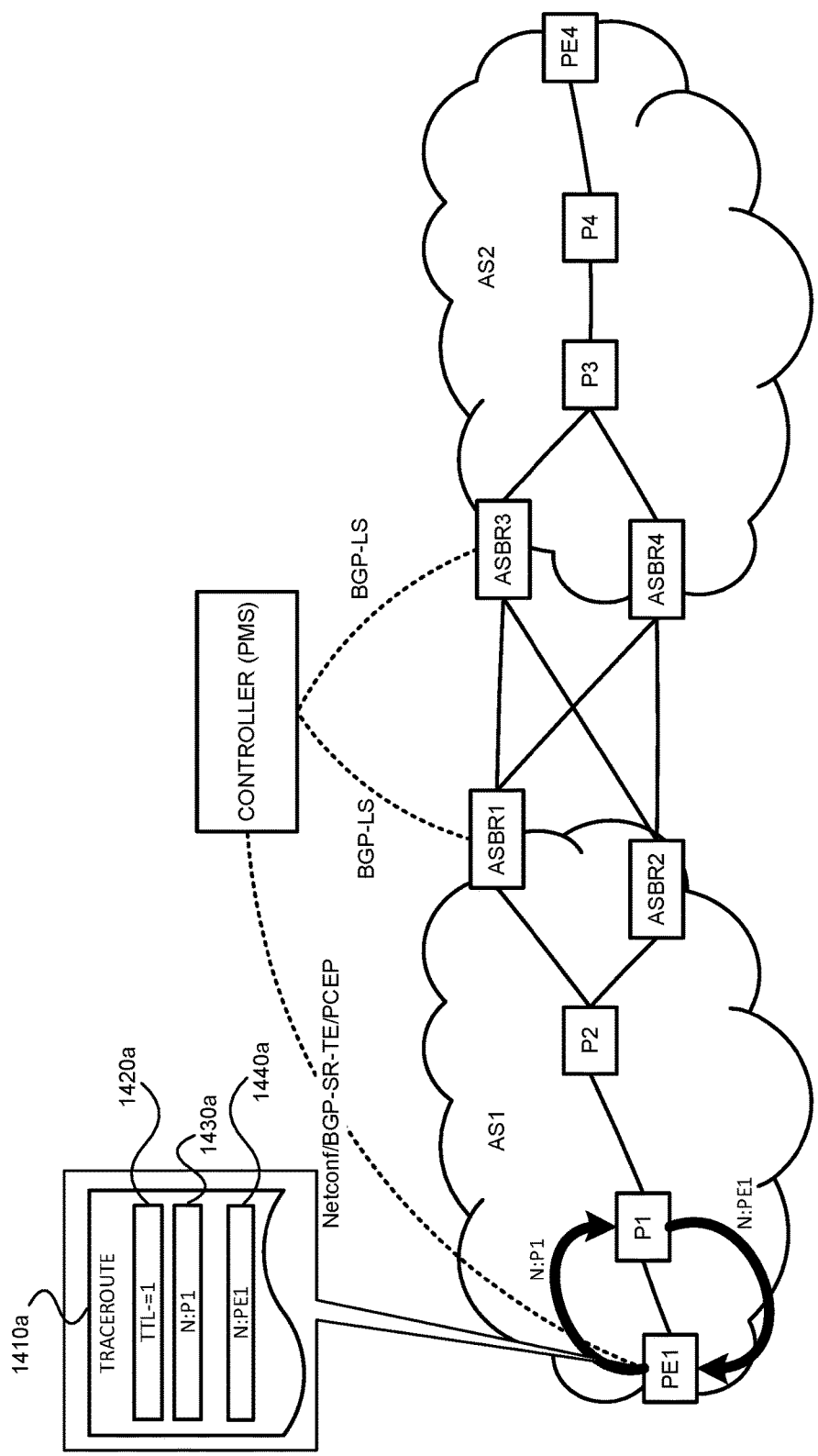
FIGS. 14A-14D illustrate operations of an example MPLS traceroute method, consistent with the present description, in an inter-AS SR network.

Assume that it is desired to perform a traceroute on a traffic engineered label switched path built from PE1 to PE4 with the label stack: N-P1, N-ASBR1, EPE-ASBR1-ASBR4 and N-PE4. Referring first to FIG. 14A, the traceroute message 1410a has a TTL value of 1 1420a, and a forwarding label 1430a to reach the first hop of the path, P1. P1 uses the return label stack (in this example, a single label) 1440a to construct a traceroute reply (not shown).

Figure 14B:
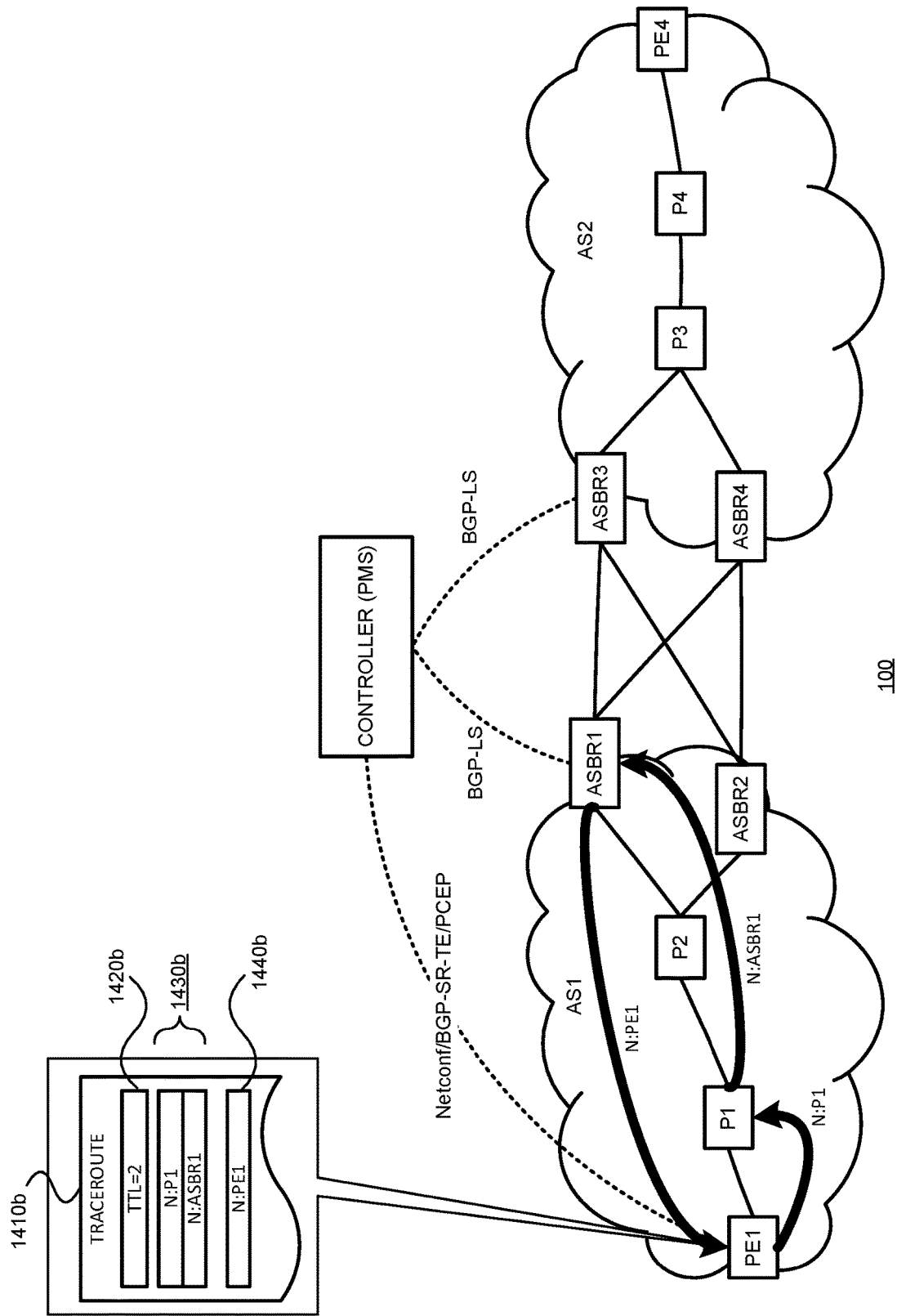

Referring next to FIG. 14B, the next traceroute message 1410b has a TTL value incremented to 2 1420b, a label stack 1430b and a return label stack (in this example, a single label) 1440b. As shown by the heavy arrows pointing to the right, the traceroute message 1410a is forwarded from PE1 to P1, and then from P1 to ASBR1 using the information in the label stack 1430b. As shown by the heavy arrow pointing back to the left, ASBR1 then uses the information the return label stack 1440b to generate a traceroute reply and send it back to PE1.

Figure 14C:
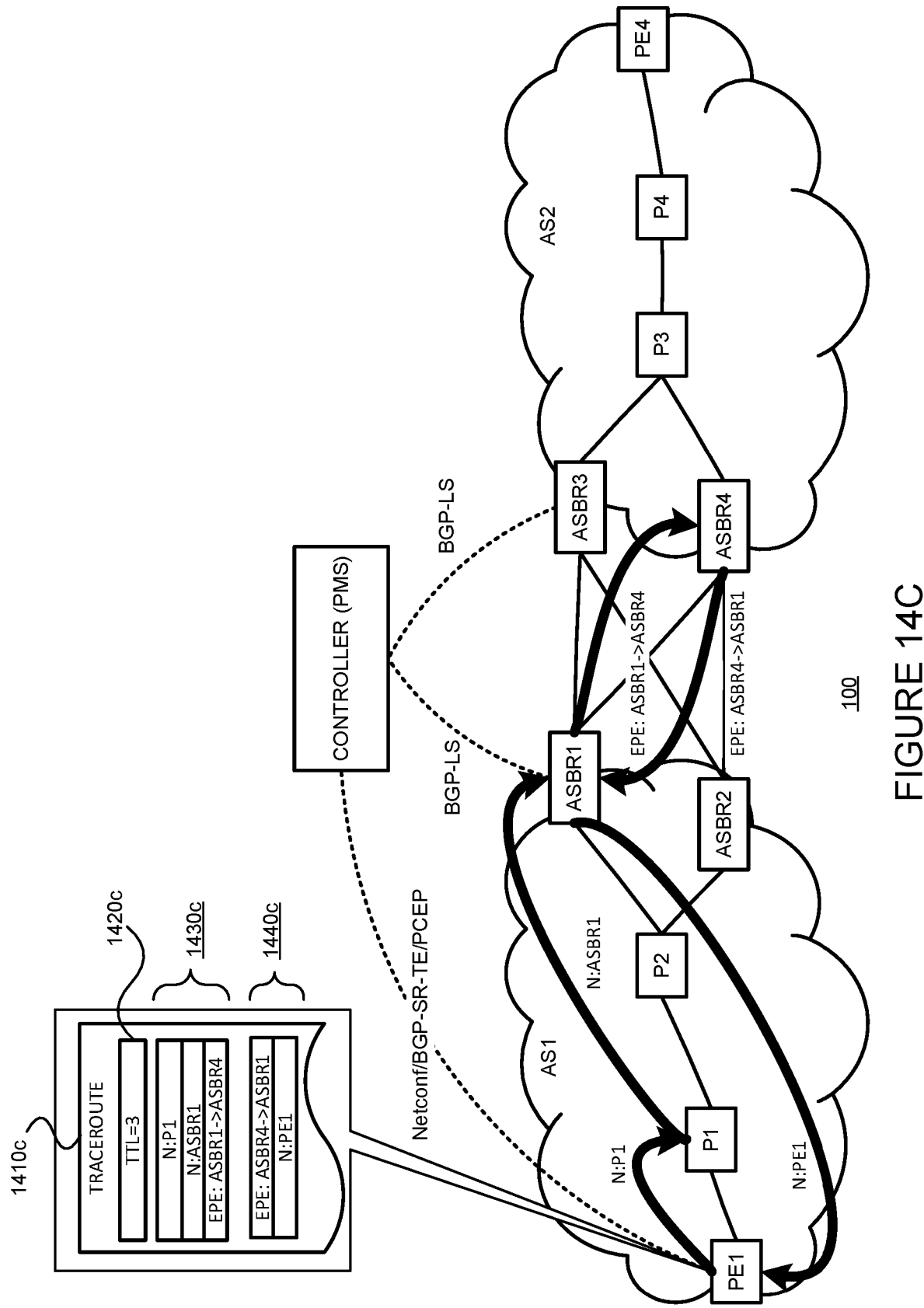

Referring next to FIG. 14C the next traceroute message 1410c has a TTL value incremented to 3 1420b, a label stack 1430c and a return label stack 1440c. As shown by the heavy arrows pointing to the right, the traceroute message 1410c is forwarded from PE1 to P1, then from P1 to ASBR1, and then from ASBR1 to ASBR4 using the information in the label stack 1430c. As shown by the heavy arrows pointing back to the left, ASBR4 then uses the information the return label stack 1440c to generate a traceroute reply and send it back to PE1 via ASBR1.

Figure 14D:
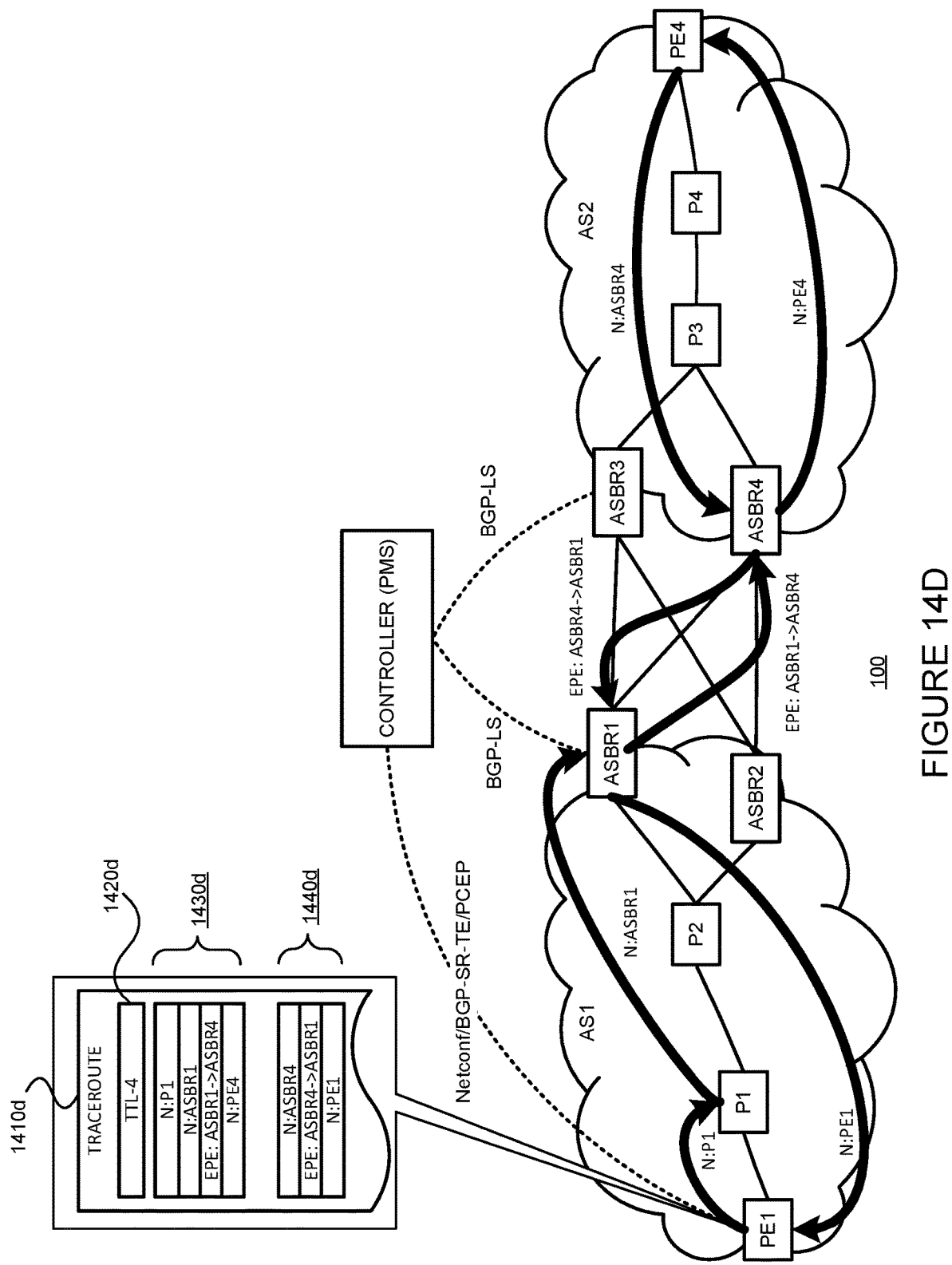

Finally, referring to FIG. 14D the next traceroute message 1410d has a TTL value incremented to 4 1420d, a label stack 1430d and a return label stack 1440d. As shown by the heavy arrows pointing to the right, the traceroute message 1410d is forwarded from PE1 to P1, then from P1 to ASBR1, then from ASBR1 to ASBR4 and finally from ASBR4 to PE4 using the information in the label stack 1430d. As shown by the heavy arrows pointing back to the left, ASBR4 then uses the information the return label stack 1440d to generate a traceroute reply and send it back to PE1 (via ASBR4 and ASBR1).

§ 4.5 Refinements, Extensions and Alternatives

Assume that the controller (PMS) initiates the MPLS traceroute procedures. Assume further that there is no return path available from the nodes inside AS1 and AS2 to the PMS. During the traceroute procedure, PMS builds a return label stack TLV and includes a label to the border-node (ASBR) which has the route to PMS in the return label stack TLV. The nodes internal to the AS1 and AS2 will build the echo-reply packet and prepare MPLS header using the labels in the return label stack.

In all of the foregoing examples, the ingress (head-end) node and/or PMS is aware of the return path from every node visited in the network and builds the return label stack for every visited node accordingly.

§ 4.6 CONCLUSIONS

The foregoing methods and apparatus provide efficient and easy mechanisms which can support Inter-AS MPLS ping and traceroute.

What is claimed is:

1. A computer-implemented method for supporting echo or traceroute functionality in a path spanning multiple autonomous systems (ASes) having segment routing (SR) enabled, the path including an ingress node and an egress node, the computer-implemented method comprising:
   a) obtaining a return label stack to reach the ingress node from either (A) the egress node, or (B) a transit node in the path;
   b) obtaining a label stack to reach, from the ingress node, either (A) the egress node, or (B) the transit node;
   c) generating a request message including the return label stack;
   d) sending the request message towards either (A) the egress node, or (B) the transit node using the label stack;
   e) receiving, by one of either (A) the egress node, or (B) the transit node, the request message, wherein the request message includes information for performing a validity check;
   f) performing a validity check using the information included in the request message to generate validity information;
   g) generating a reply message including the validity information and forwarding information from the return label stack, the forwarding information including at least two labels that enable the reply message to reach the ingress node from the one of either (A) the egress node, or (B) a transit node in the path; and
   h) sending the reply message towards the ingress node using the forwarding information from the return label stack included in the request message,
      wherein the request message is an echo request packet,
      wherein the return label stack includes at least two labels that enable a reply message from the egress node to reach the ingress node, and
      wherein the echo request packet is sent towards the egress node using the label stack.

2. The computer-implemented method of claim 1 wherein the information for performing a validity check is a forwarding equivalency class (FEC) of the egress node.

3. The computer-implemented method of claim 1 wherein the ingress node is in a first one of the multiple ASes and the egress node is in a second one of the multiple ASes.

4. The computer-implemented method of claim 1 wherein the return label stack is encoded in a return label stack type-length-value (TLV) ping or traceroute data structure, and wherein the TLV data structure includes a field defining a number of elements in the return label stack.

5. The computer-implemented method of claim 1 wherein the return label stack includes at least two types of labels selected from a group of label types consisting of (A) an Interior Gateway Protocol (IGP) segment identifier, (B) an IGP node segment identifier, (C) an IGP adjacency segment identifier, (D) a border gateway protocol (BGP) segment identifier, and (E) a binding segment identifier.

6. The computer-implemented method of claim 1 wherein the request message is an traceroute request packet, and
wherein the traceroute request packet includes a time to live (TTL) value which is set such that the traceroute request packet reaches either (A) a transit node of the path, or (B) the egress node.

7. The computer-implemented method of claim 6 wherein the return label stack is encoded in a return label stack type-length-value (TLV) data structure.

8. The computer-implemented method of claim 7 wherein the TLV data structure includes a field defining a number of elements in the return label stack.

9. The computer-implemented method of claim 7 wherein the return label stack includes at least two types of labels selected from a group of label types consisting of (A) an Interior Gateway Protocol (IGP) segment identifier, (B) an IGP node segment identifier, (C) an IGP adjacency segment identifier, (D) a border gateway protocol (BGP) segment identifier, and (E) a binding segment identifier.

10. The computer-implemented method of claim 1 wherein the return label stack is obtained by the ingress node from a path monitoring system (PMS) controller outside the path.

11. A system for supporting echo or traceroute functionality in a path spanning multiple autonomous systems (ASes) having segment routing (SR) enabled, the system comprising:
    an ingress node of the path, the ingress node including
        a) an input interface for obtaining
            1) a return label stack to reach the ingress node from the egress node, and
            2) a label stack to reach, from the ingress node, an egress node of the path,
        b) at least one processor for generating a request message including the return label stack, and
        c) an output interface for sending the request message towards the egress node using the label stack; and
    the egress node of the path, the egress node including
        a) an input interface for receiving the request message, wherein the request message includes information for performing a validity check,
        b) at least one processor for
            1) performing a validity check using the information included in the request message to generate validity information, and
            2) generating a reply message including the validity information and forwarding information from the return label stack, the forwarding information including at least two labels that enable the reply message to reach the ingress node from the egress node, and
        c) an output interface for sending the reply message towards the ingress node using the forwarding information from the return label stack included in the request message,
    wherein the request message is an echo request packet,
    wherein the return label stack includes at least two labels that enable a reply message from the egress node to reach the ingress node, and
    wherein the echo request packet is sent towards the egress node using the label stack.

12. The system of claim 11 wherein the ingress node is in a first one of the multiple ASes and the egress node is in a second one of the multiple ASes.

13. The system of claim 11 wherein the request message is one of (A) an echo request packet, and (B) a traceroute packet.

14. The system of claim 13 wherein the return label stack is encoded in a return label stack type-length-value (TLV) data structure, and wherein the TLV data structure includes a field defining a number of elements in the return label stack.

15. The system of claim 14 wherein the return label stack includes at least two types of labels selected from a group of label types consisting of (A) an Interior Gateway Protocol (IGP) segment identifier, (B) an IGP node segment identifier, (C) an IGP adjacency segment identifier, (D) a border gateway protocol (BGP) segment identifier, and (E) a binding segment identifier.

16. The system of claim 11 further including a path monitoring system (PMS) controller outside the path, wherein the return label stack is obtained by the ingress node from the PMS controller.

17. A non-transitory computer-readable medium storing program instructions, which when executed by at least one processor in a system for supporting echo or traceroute functionality in a path spanning multiple autonomous systems (ASes) having segment routing (SR) enabled, the path including an ingress node and an egress node, causes the at least one processor to perform a method comprising:
    a) obtaining a return label stack to reach the ingress node from one of either (A) the egress node, or (B) a transit node in the path;
    b) obtaining a label stack to reach, from the ingress node, either (A) the egress node, or (B) the transit node;
    c) generating a request message including the return label stack;
    d) sending the request message towards either (A) the egress node, or (B) the transit node using the label stack,
    e) receiving, by either (A) the egress node, or (B) the transit node, the request message, wherein the request message includes information for performing a validity check;
    f) performing a validity check using the information included in the request message to generate validity information;
    g) generating a reply message including the validity information and forwarding information from the return label stack, the forwarding information including at least two labels that enable the reply message to reach the ingress node from the one of either (A) the egress node, or (B) a transit node in the path; and
    h) sending the reply message towards the ingress node using the forwarding information from the return label stack included in the request message,
        wherein the request message is an echo request packet,
        wherein the return label stack includes at least two labels that enable a reply message from the egress node to reach the ingress node, and
        wherein the echo request packet is sent towards the egress node using the label stack.

* * * * *